Dec. 9, 1924.

R. HOLMAN 1,518,261

MACHINE FOR MAKING PAPER CUPS

Filed March 4, 1922      15 Sheets-Sheet 1

Dec. 9, 1924.

R. HOLMAN 1,518,261

MACHINE FOR MAKING PAPER CUPS

Filed March 4, 1922 15 Sheets-Sheet 3

Dec. 9, 1924.

R. HOLMAN 1,518,261

MACHINE FOR MAKING PAPER CUPS

Filed March 4, 1922 15 Sheets-Sheet 5

Fig. 5

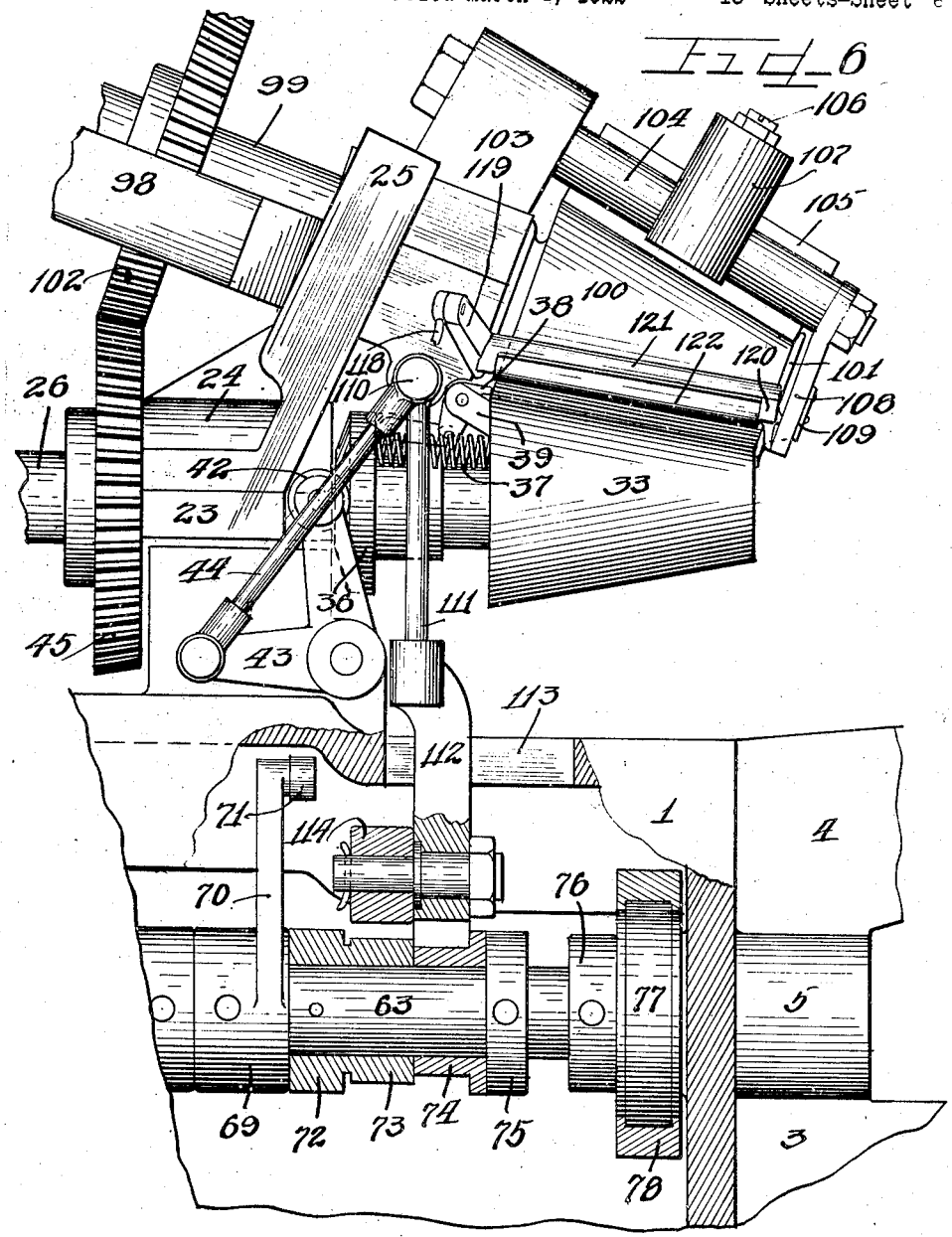

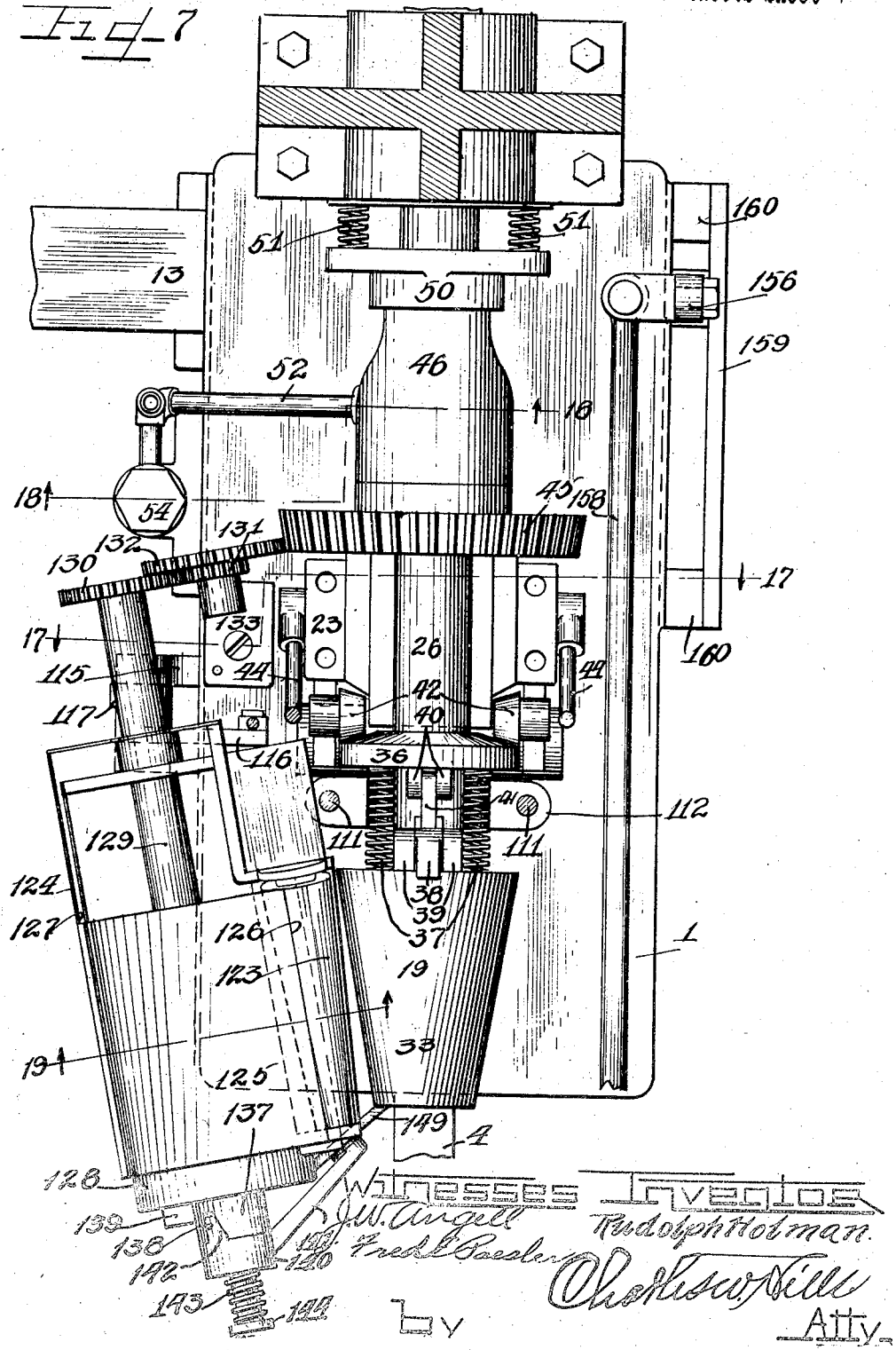

Dec. 9, 1924.
R. HOLMAN
1,518,261
MACHINE FOR MAKING PAPER CUPS
Filed March 4, 1922    15 Sheets-Sheet 8
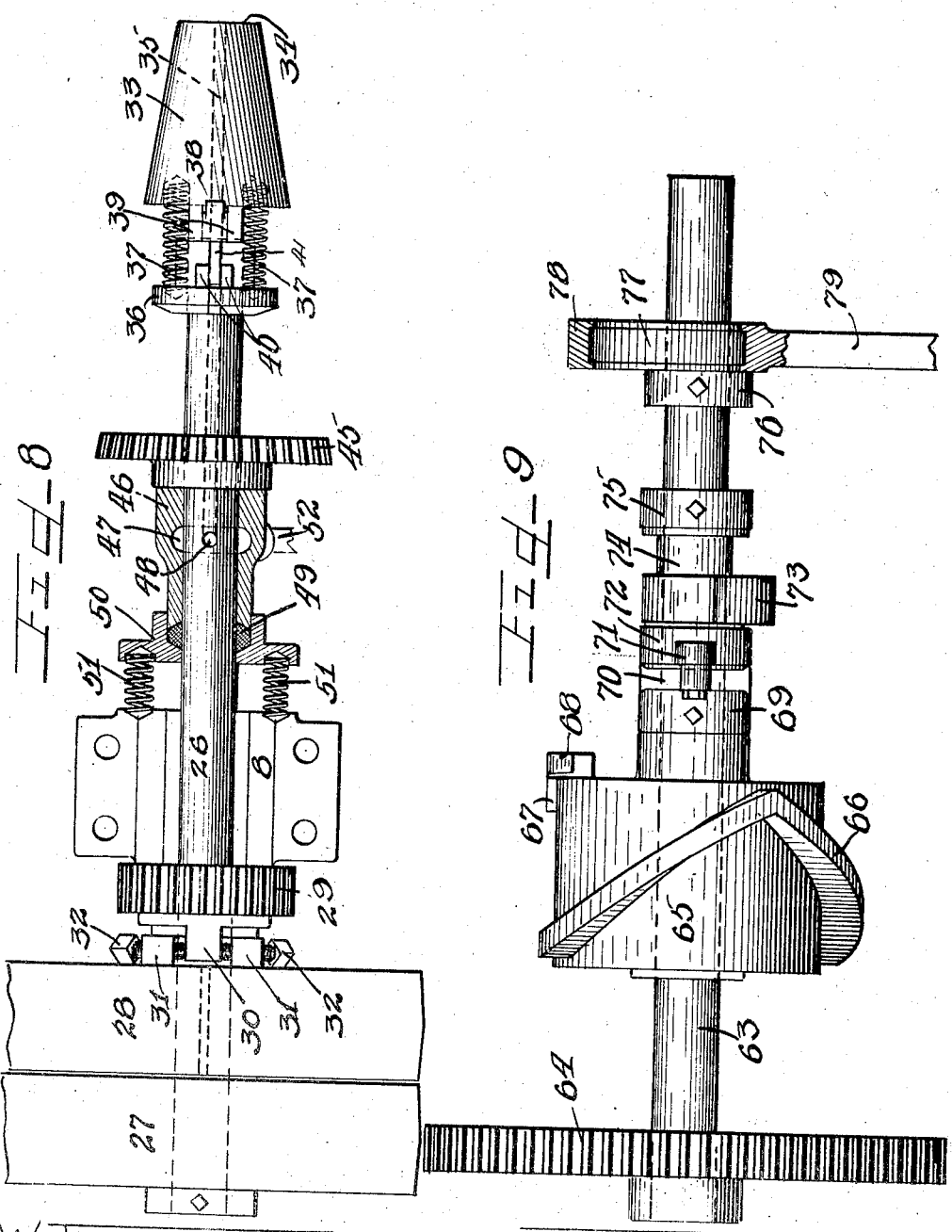

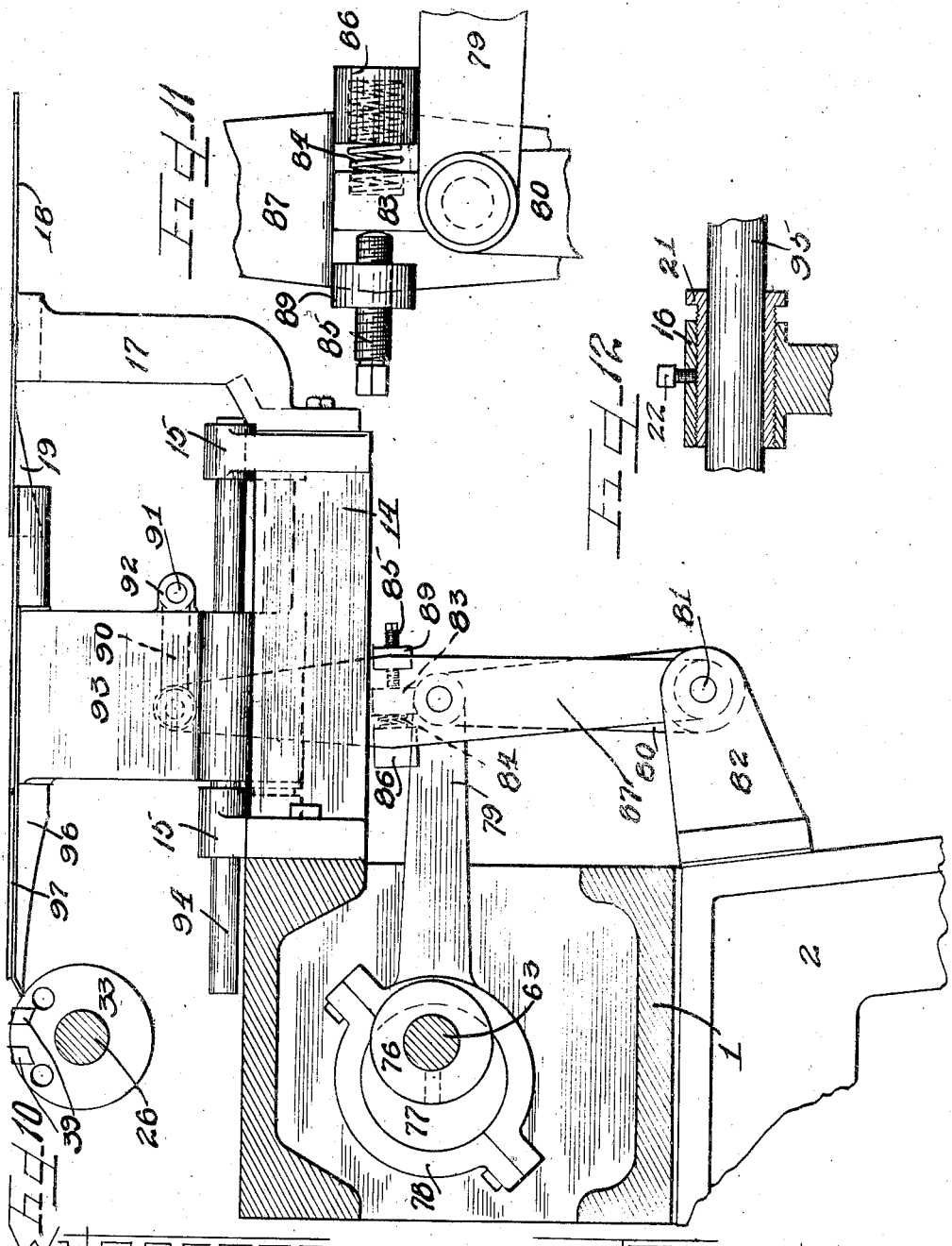

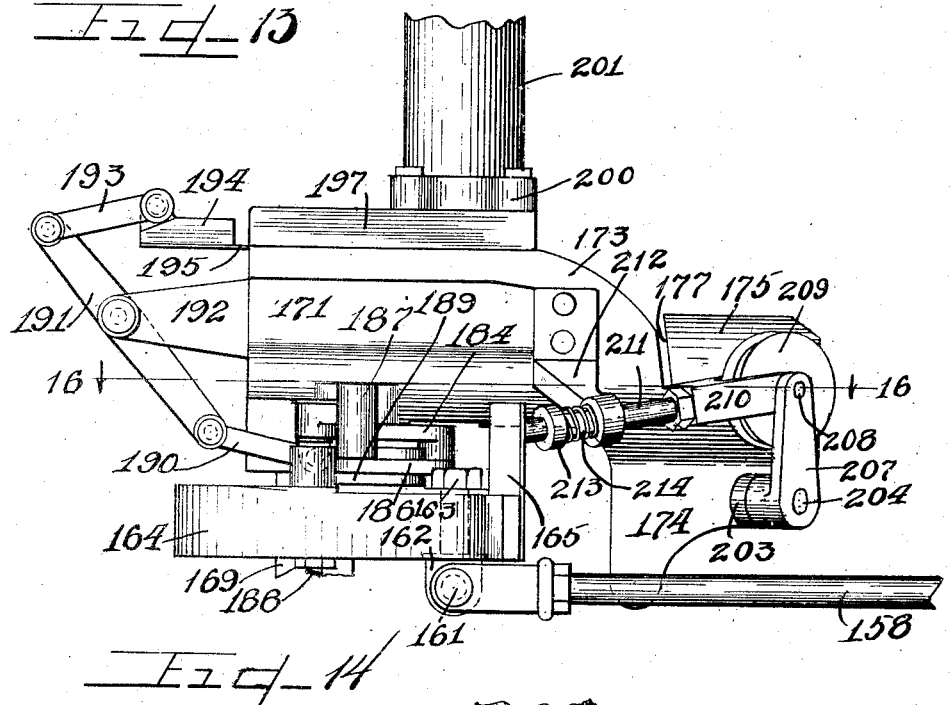
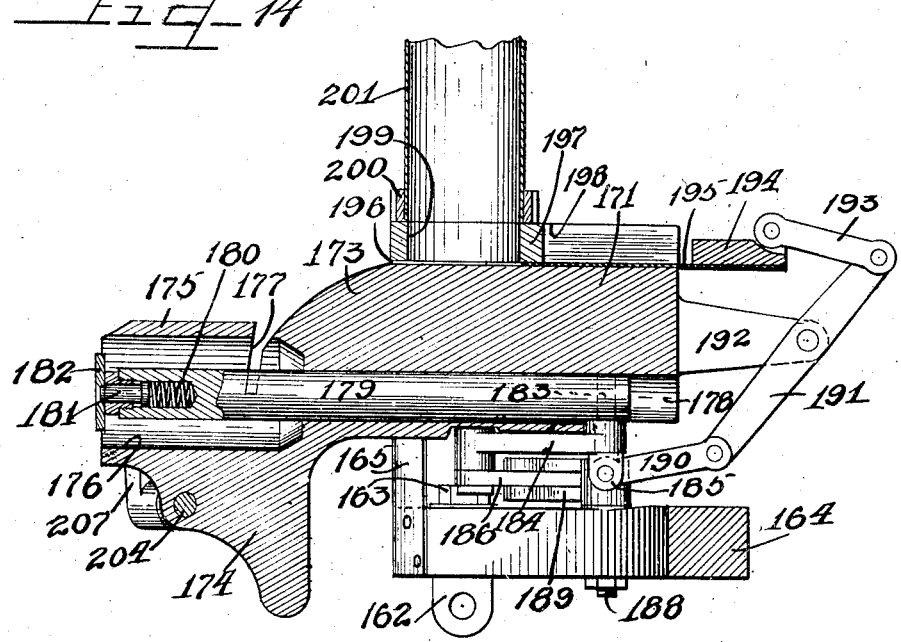

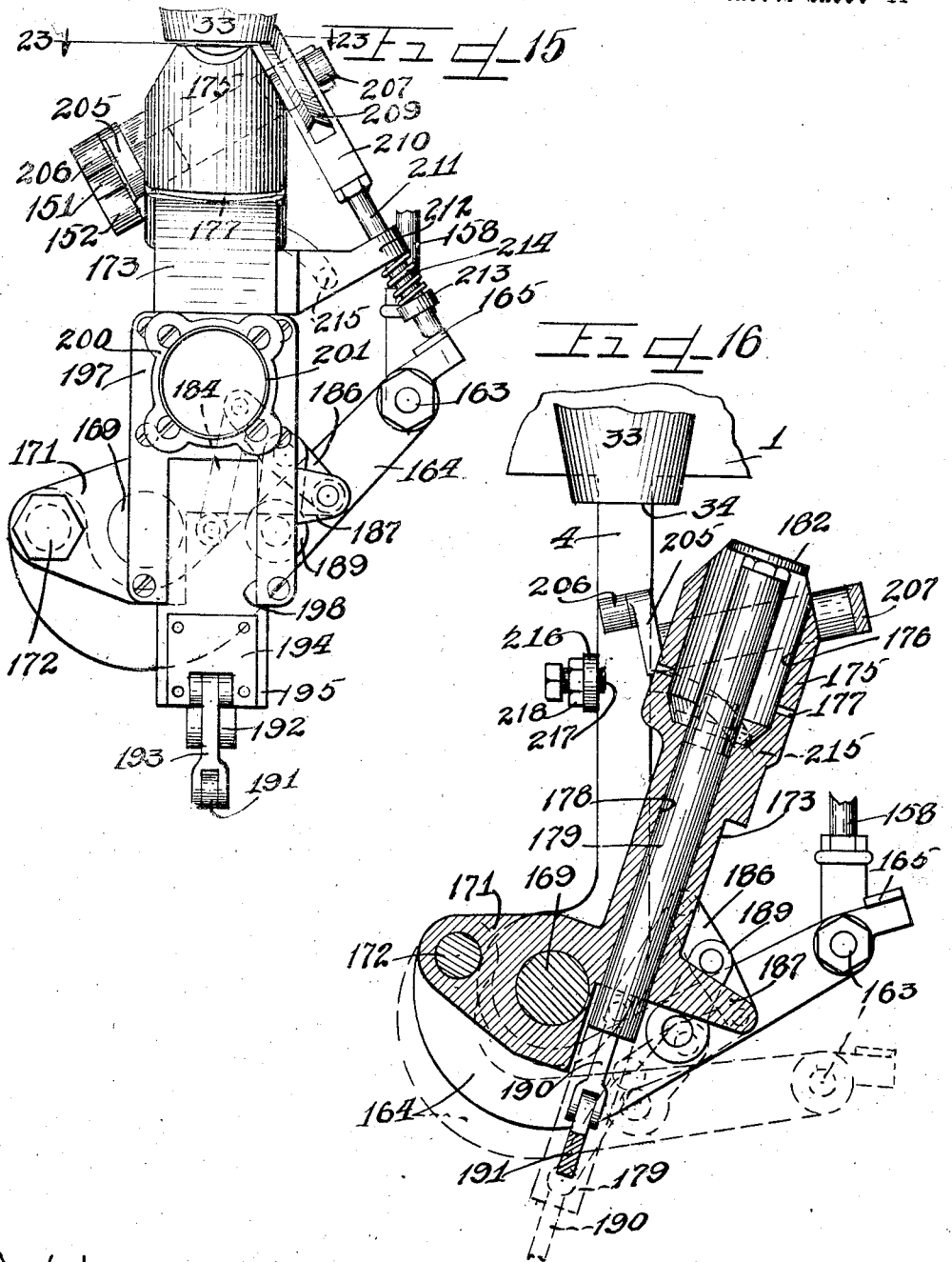

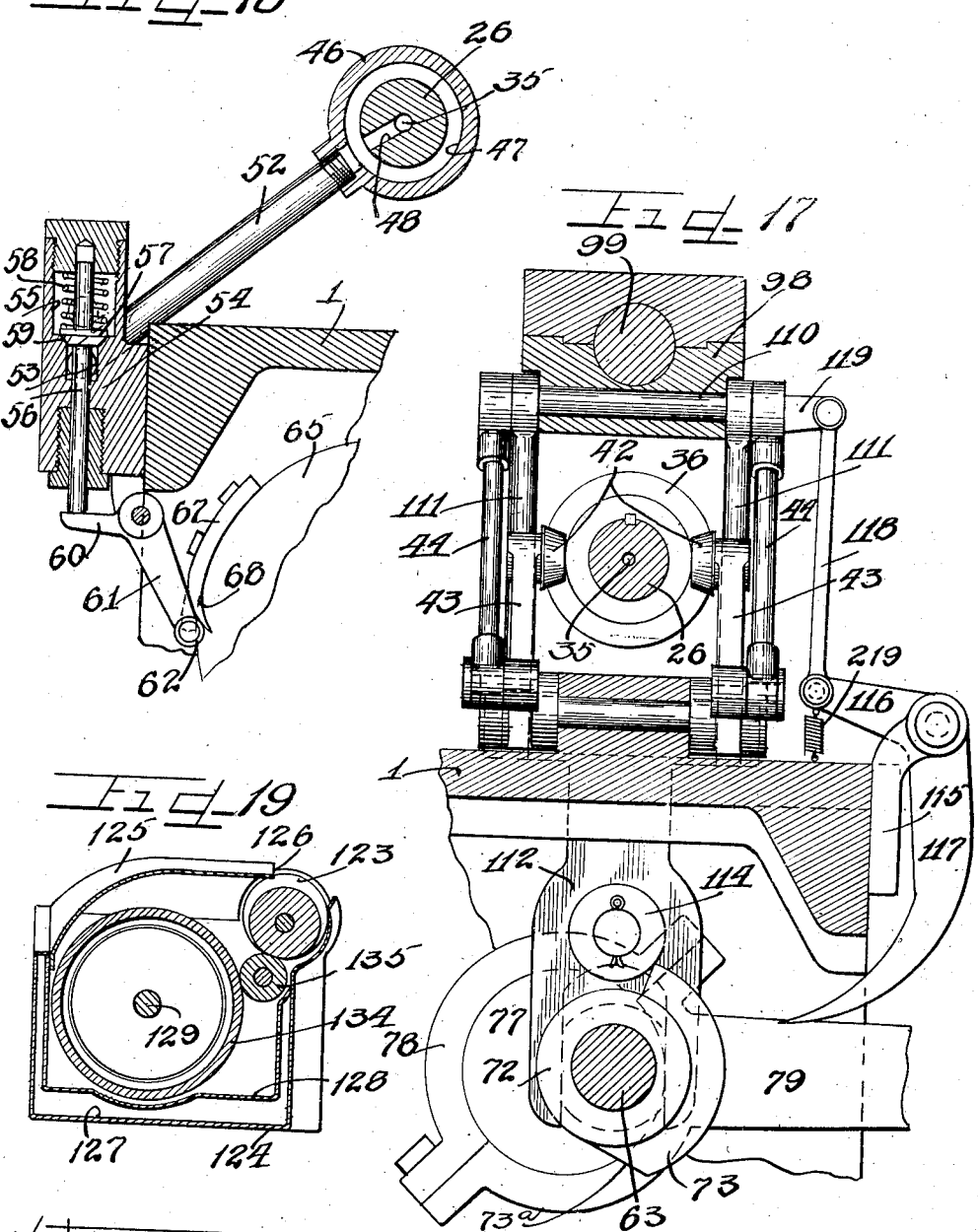

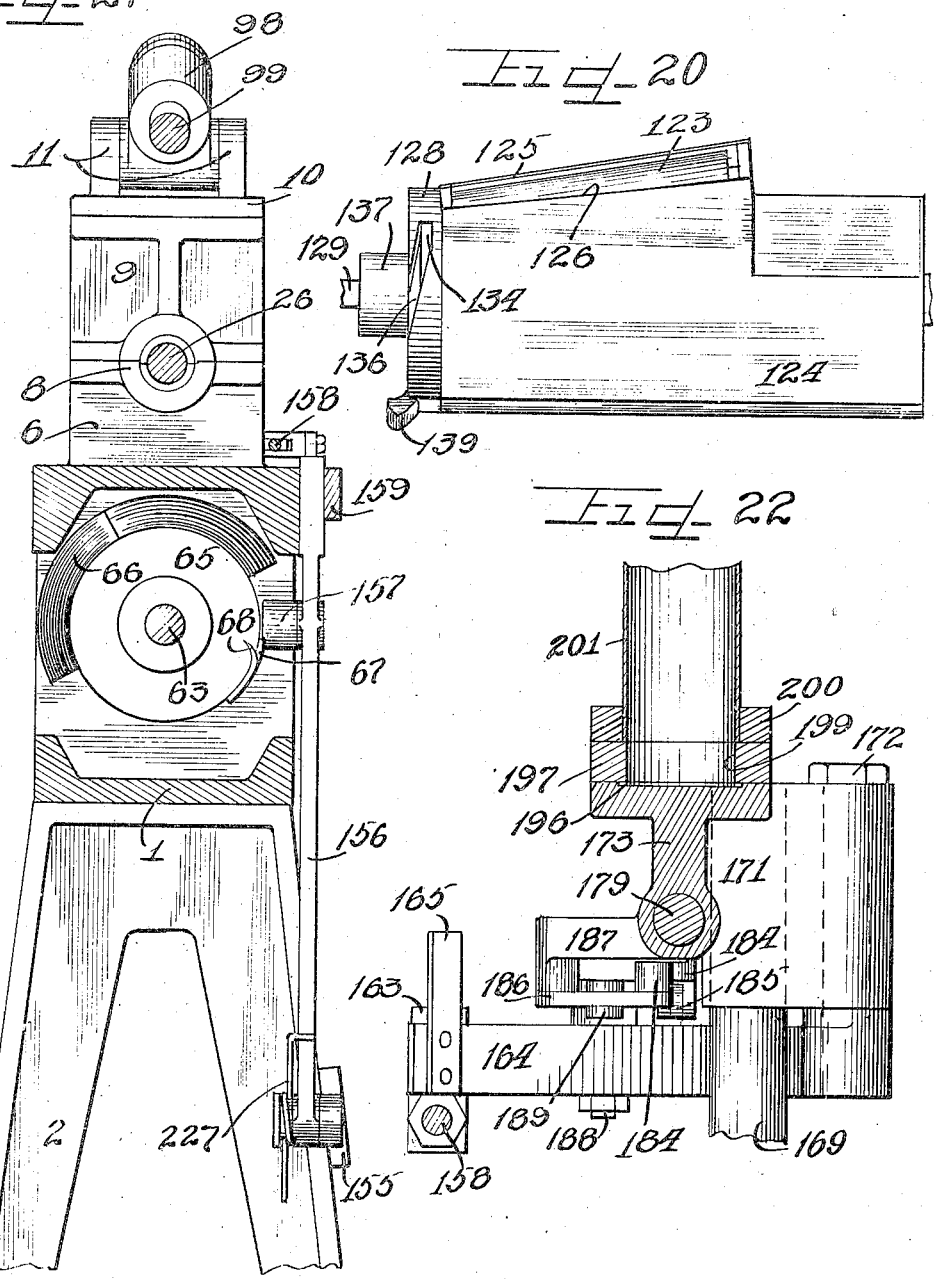

Dec. 9, 1924.  
R. HOLMAN  
1,518,261  
MACHINE FOR MAKING PAPER CUPS  
Filed March 4, 1922  15 Sheets-Sheet 14
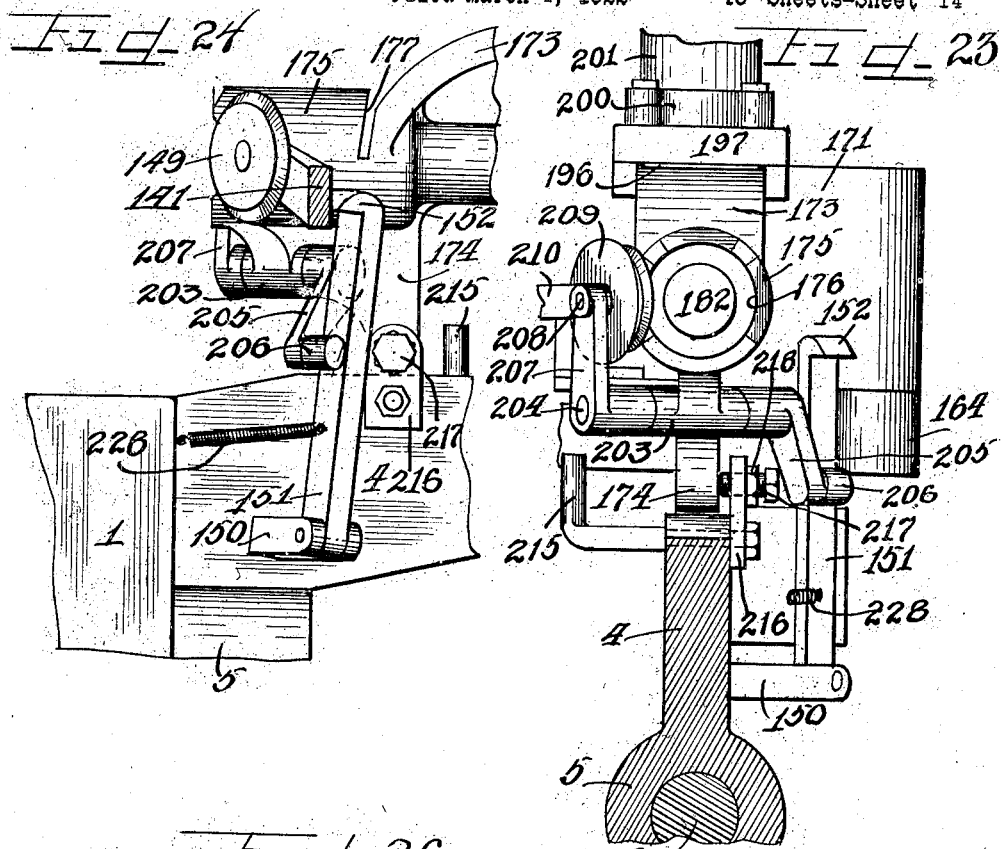
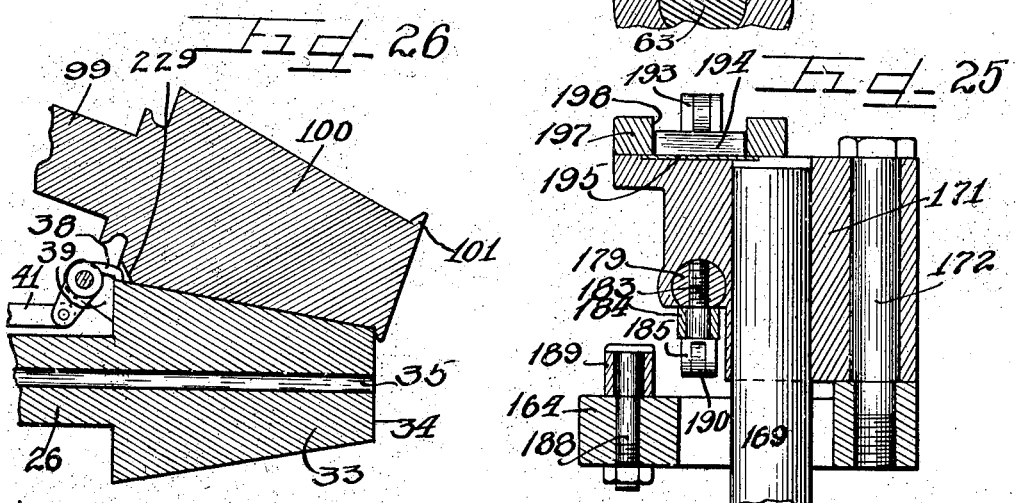

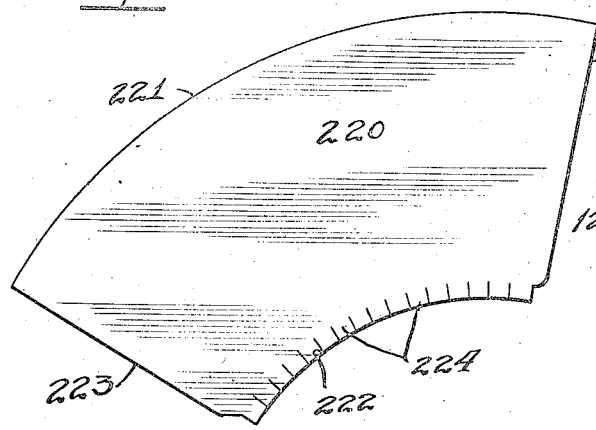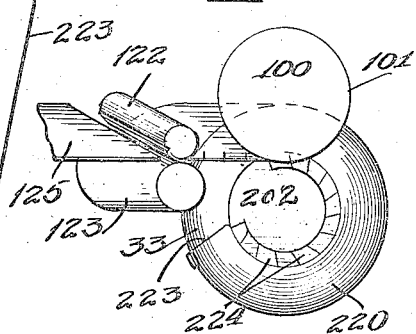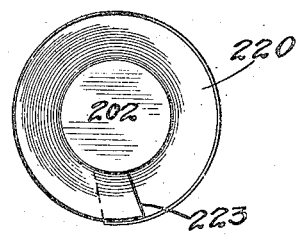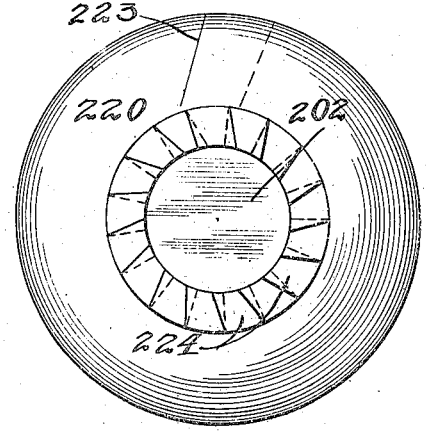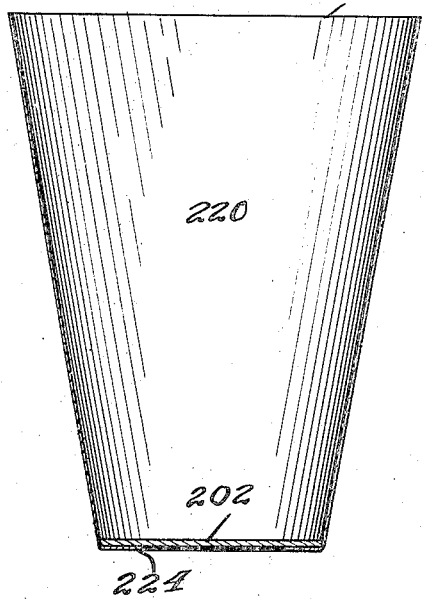

Patented Dec. 9, 1924.

1,518,261

UNITED STATES PATENT OFFICE.

RUDOLPH HOLMAN, OF CHICAGO, ILLINOIS, ASSIGNOR TO THE VORTEX MFG. CO., OF CHICAGO, ILLINOIS, A CORPORATION OF ILLINOIS.

MACHINE FOR MAKING PAPER CUPS.

Application filed March 4, 1922. Serial No. 540,961.

*To all whom it may concern:*

Be it known that I, RUDOLPH HOLMAN, a citizen of the United States, and a resident of the city of Chicago, in the county of Cook and State of Illinois, have invented certain new and useful Improvements in a Machine for Making Paper Cups; and I do hereby declare that the following is a full, clear, and exact description of the same, reference being had to the accompanying drawings and to the numerals of reference marked thereon, which form a part of this specification.

This invention relates more particularly to an improved type of a cup forming machine adapted to automatically produce flat bottomed paper cups from properly shaped paper blanks fed into the machine.

It is an object of this invention to provide a machine adapted to produce flat bottomed paper cups in large quantities.

It is also an object of the invention to provide a power driven machine adapted to automatically assemble, form and glue a plurality of blanks to one another to form a liquid-tight flat-bottomed paper cup adapted to stand independently of a holder.

Another object of the invention is to provide a machine having mechanisms adapted to form a body blank around a bottom blank, apply an adhesive to both the body blank and the bottom blank, seal the overlapping margins of the body blank and then bend and press portions of said body blank against the adhesived portion of the bottom blank to form a flat bottomed paper cup.

It is a further object of this invention to provide a machine adapted to automatically form a flat-bottomed paper cup adapted to be blown from a former when completed.

It is furthermore an object of the invention to provide a cup forming machine having a mechanism for feeding and holding a flat bottom blank against a forming member while a body blank is formed around the forming member and around the bottom blank and glued to said bottom blank to form a completed flat-bottomed cup.

It is an important object of this invention to provide an improved positively acting automatic machine wherein a main driving shaft is equipped with a forming cone and is adapted to drive a cam shaft for operating mechanism at predetermined times whereby blanks are fed into the machine, treated with an adhesive and then formed and pressed against one another to produce a liquid-tight flat-bottomed cup which when completed is adapted to be automatically released and blown from the forming cone.

Another important object of this invention is the construction of a cup forming machine having feeding mechanisms adapted to simultaneously apply a plurality of paper blanks to a forming cone, apply an adhesive to one of said blanks, form the other blank around the first blank and press parts of the second blank to the adhesived portions of the first blank, and then apply adhesive to one margin of the second blank to permit another margin thereof to be pressed against the adhesived margin to form a completed flat-bottomed cup.

Other and further important objects of this invention will be apparent from the disclosures in the specification and the accompanying drawings.

The invention (in a preferred form) is illustrated in the drawings and hereinafter more fully described.

On the drawings:

Figure 5 is a similar view showing the parts in a different position.

Figure 6 is an enlarged fragmentary view of the forming rolls in coacting engagement and with parts of the cam shaft mechanism shown in section.

Figure 7 is an enlarged plan view of the main driving shaft mechanism and the main forming roll together with the glue applying mechanism for the body forms of the cups.

Figure 8 is a detail plan view partly in section of the driving shaft mechanism and the main forming cone.

Figure 9 is a detail plan view of the cam shaft and the cams thereon.

Figure 10 is a detail sectional view taken on line 10—10 of Figure 1 with parts broken away and with parts omitted.

Figure 11 is an enlarged fragmentary detail view of the lost motion takeup mechanism connected with the table operating levers.

Figure 12 is an enlarged fragmentary detail section of the adjustable stop mechanism for the table taken on line 12—12 of Figure 4.

Figure 13 is an enlarged fragmentary view of the feed and pressing mechanisms for the cup bottoms taken on line 13—13 of Figure 2.

Figure 14 is a longitudinal detail section of the mechanisms shown in Figure 13 with parts in elevation.

Figure 15 is a top plan view of the feed and pressing mechanisms for the cup bottoms shown in Figure 13.

Figure 16 is a sectional view taken on line 16—16 of Figure 13 showing the operation in dotted lines and with parts moved into a different position than illustrated in Figure 15.

Figure 17 is a fragmentary detail sectional view taken on line 17—17 of Figure 7.

Figure 18 is a fragmentary detail section through the air valve mechanism taken on line 18—18 of Figure 7 with parts shown in elevation.

Figure 19 is a detail section through the glue distributing mechanism taken on line 19—19 of Figure 7.

Figure 20 is a front view of the glue tank.

Figure 21 is a sectional view taken on line 21—21 of Figure 3.

Figure 22 is a sectional perspective view taken on line 22—22 of Figure 1.

Figure 23 is a view taken on line 23—23 of Figure 15.

Figure 24 is a perspective view taken on line 24—24 of Figure 5 with parts omitted.

Figure 25 is an enlarged fragmentary detail section taken on line 25—25 of Figure 2 with parts omitted and with parts shown in elevation.

Figure 26 is an enlarged fragmentary detail section taken longitudinally through the two cup forming cone rolls.

Figure 27 is a perspective end view of the main forming roll and the pressure roll, together with the glueing rollers shown applying glue to a margin of a cup form as the form is being formed into a flat-bottomed cup.

Figure 28 is a developed view of one of the cup body forms.

Figure 29 is a top plan view of a finished flat-bottomed cup.

Figure 30 is an enlarged bottom plan view of a finished flat-bottomed cup.

Figure 31 is a vertical section through a finished flat bottomed cup.

As shown on the drawings:

Figure 1:
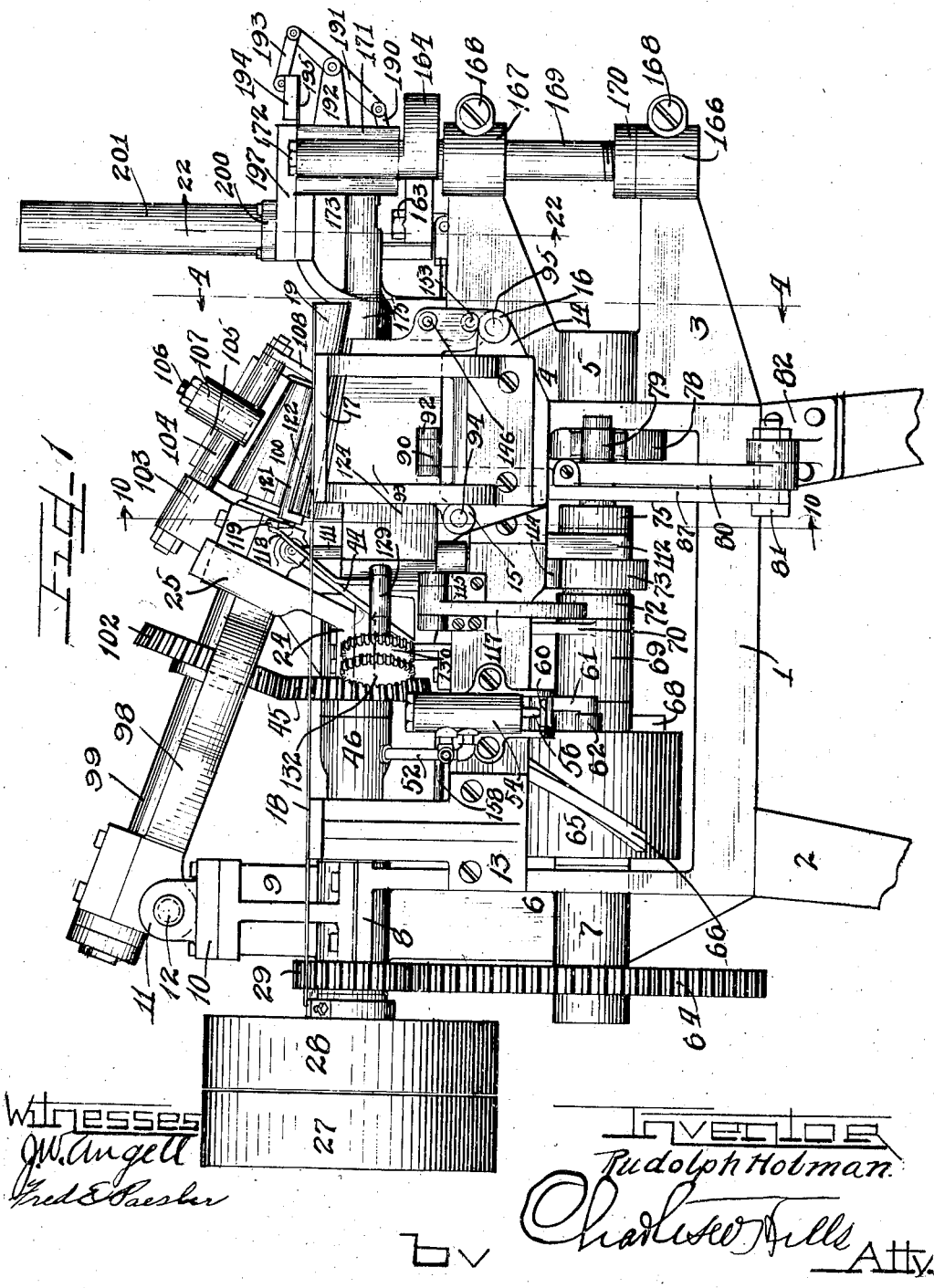
Figure 1 is a front elevation of a machine for making paper vessels embodying the principles of this invention.

The reference numeral 1 indicates a machine frame supported on legs 2. Integrally formed on the feeding and forming end of the machine frame 1 is a lower arm 3 and an upper arm 4 separated by an integral cam shaft bearing 5. Integrally formed on the opposite driving end of the machine frame 1 is an upright arm or head 6 having a cam shaft bearing 7 integrally formed thereon in alignment with the bearing 5. Formed integrally on the top of the arm 6 is a lower main shaft bearing section 8. Bolted upon the bearing section 8 is an upper bearing section 9. Secured upon the top of the upper bearing section 9 is a plate 10 having a pair of apertured lugs 11 integrally formed thereon for supporting a stub shaft or pin 12.

Figure 2:
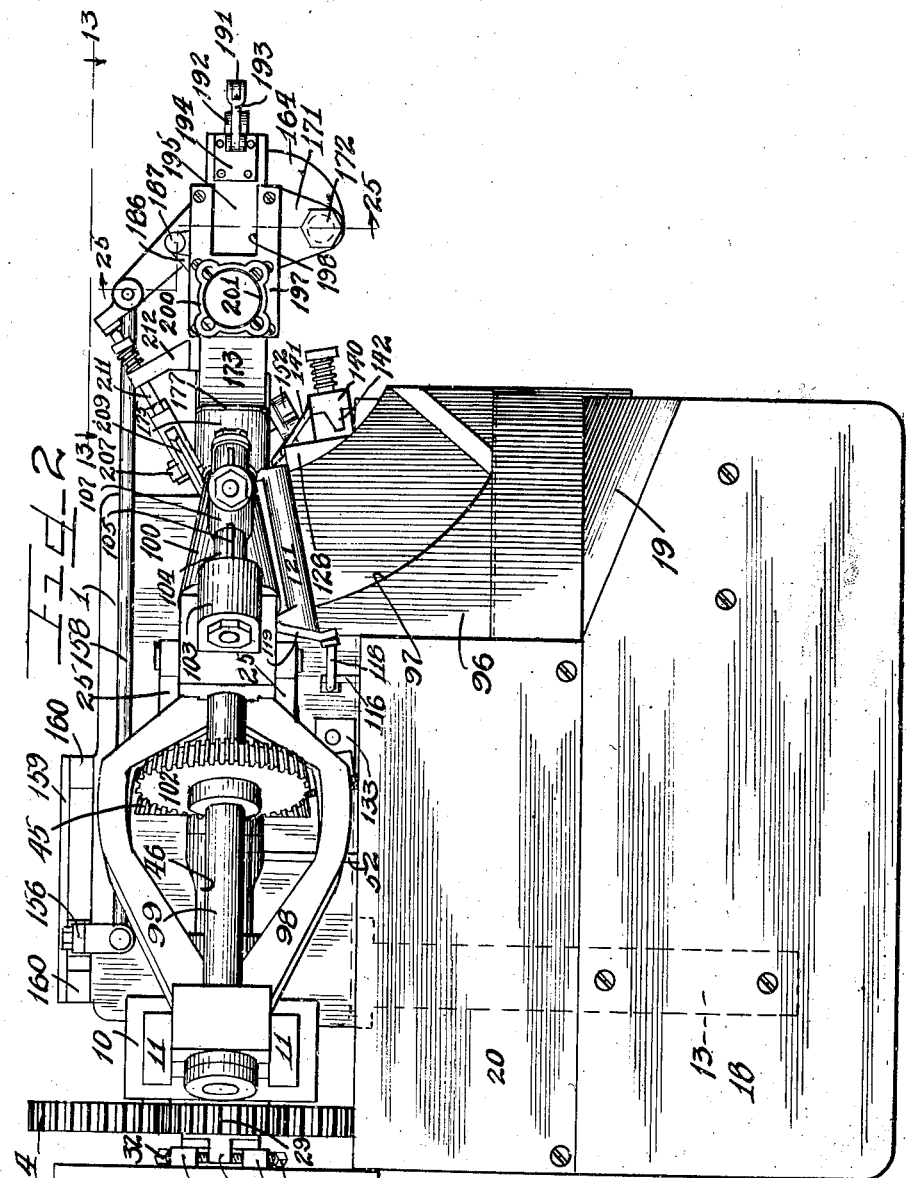
Figure 2 is a top plan view of the machine.
Figure 3:
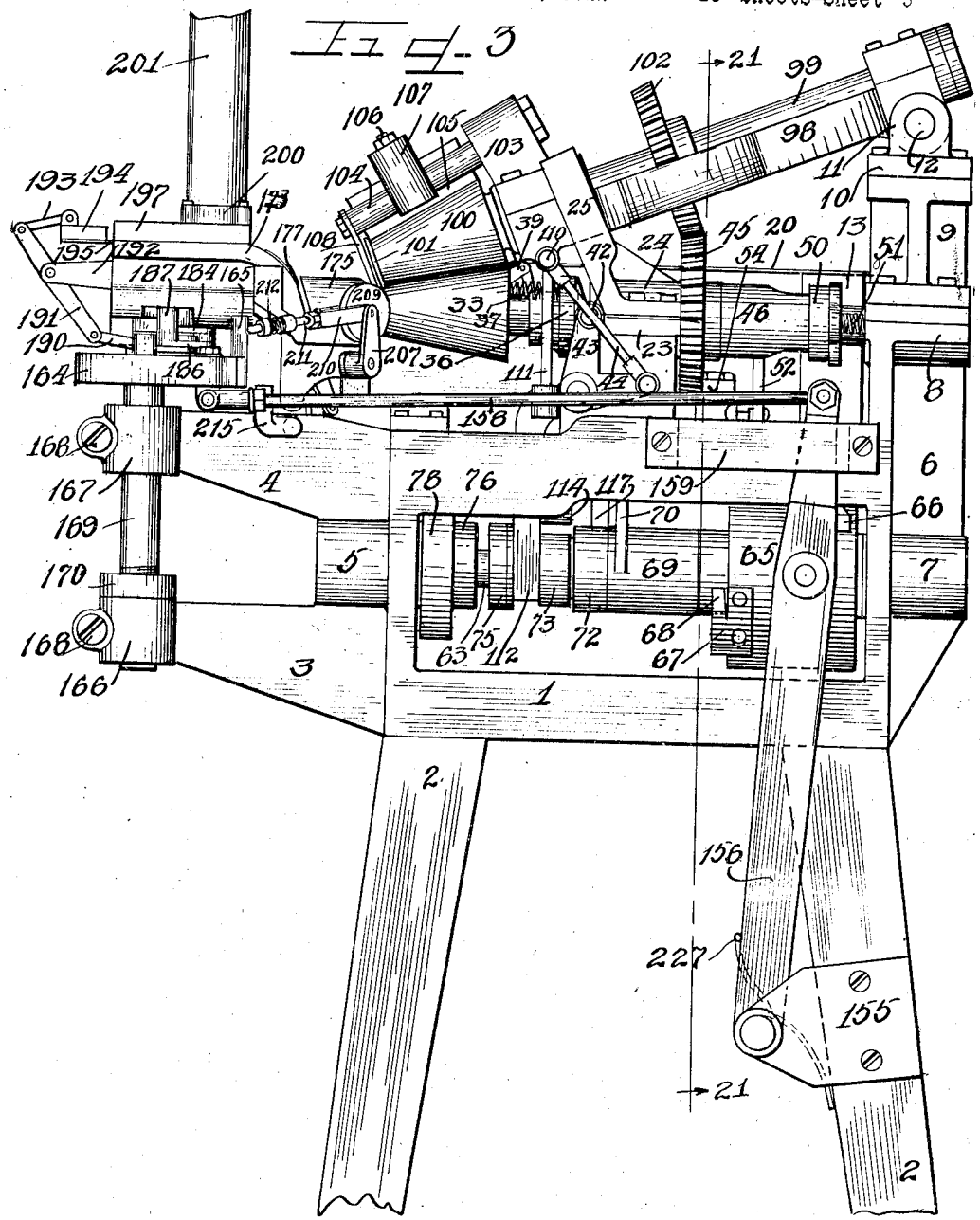
Figure 3 is a rear elevation of the machine with parts broken away and omitted.

Rigidly secured by screws or other suitable means to the front side of the machine frame 1 is a table supporting bracket 13. Bolted at right angles to the front side of the upper portion of the frame 1 is a horizontal feed carriage supporting arm or beam 14 having formed at each end thereof bearing arms 15 and 16. The bearing arms 15 at one side of the beam 14 are positioned at a higher elevation than the bearing arms 16 on the other side of said beam. A flanged threaded carriage stop sleeve 21 is adjustably threaded into one of the bearing arms 16 and is held in a set position by a set screw 22, as shown in Figure 12. Rigidly secured to the outer end of the beam 14 is a table supporting bracket 17. Supported upon the horizontal arms of the brackets 13 and 17 is a stock supporting stationary table 18, one corner of which is deflected downwardly to afford an inclined feed apron 19 for cup body blanks. A stock table extension 20 is supported upon the bracket 13 to the inside of the table 18 to which it is secured. The table extension plate 20 is shorter than the table 18 and terminates at the apron 19 as illustrated in Figure 2.

Also supported on the top of the machine frame 1 is a bearing 23 having a removable top bearing section 24 secured thereon. Integral with the top bearing section 24 are two upwardly inclined guide bars 25. Journalled in the bearings 8—9 and 23—24 is a main driving shaft 26 having mounted on the outer projecting end thereof an idler driving pulley 27 and a driven pulley 28. The pulley 28 is keyed to the shaft 26. The pulley 27 is adapted to be driven by means of a belt from any suitable source of power. A manually controlled clutch mechanism (not shown) is provided for locking the pulley 28 with the pulley 27 in the ordinary manner to permit a drive to be imparted to the main shaft 26 of the machine.

Adjustably engaged on the main shaft 26 to the outside of the bearing 8—9 is a driving gear 29 having a lug 30 formed on the outer side thereof. Lugs 31 are formed on the pulley 28 and have adjusting screws 32 projecting therethrough to contact the gear lug 30 to permit adjustment of the gear 29 relative to the shaft 26 and the pulley 28.

Formed on the inner end of the main shaft 26 is a main cup forming frustum-shaped roller or cone 33 having a flat circular end surface 34. The inner end portion of the main shaft 26 and the frustum cone 33 are provided with a longitudinal air outlet passage 35 shown in Figures 8 and 26 and terminating in the cone end face 34. Slidably mounted upon the main shaft 26 near the enlarged end of the main forming cone 33 is a beveled collar 36 separated from the enlarged end of the cone 33 by coiled springs 37, the ends of which are seated in recesses in said cone and collar. A cup gripping bell crank finger 38 is pivotally mounted between a pair of lugs 39 formed on the enlarged end of the cone 33. Formed on the face of the collar 36 nearest the cone 33 are a pair of spaced guide lugs 40 between which one end of a link 41 is pivoted. The other end of the link 41 is pivoted to the bell crank gripping finger 38. Engaging the beveled surface of the slidable collar are two beveled rollers 42 which are rotatably mounted on the long arms of a pair of bell cranks 43. The bell cranks 43 are pivotally supported on the opposite sides of the bearing section 23. Pivotally connected to the short arms of the bell cranks 43 are the ends of two connecting rods 44.

Secured on the main shaft 26 adjacent the bearing section 23 is a beveled driving gear 45. Mounted on the main shaft 26 adjacent the packed hub of the gear 45 is a sleeve 46 having a circular air chamber or recess 47 therein communicating with an auxiliary radial passage 48 in the main shaft 26 at the inner end of the long passage 35, as illustrated in Figures 8 and 18. Seated in the reduced end of the sleeve 46 is a packing ring 49 held in place by a flanged collar 50 on the main shaft 26. Coiled springs 51 are engaged between the collar 50 and the bearing 8—9. Connected with the sleeve 46 to communicate with the air chamber 47 is one end of an air pipe 52, the other end of which is connected with the air outlet chamber 53 of an air valve casing 54, as shown in Figure 18. The air valve casing 54 is mounted upon the front side of the machine frame 1 and is adapted to have compressed air, from any convenient source, supplied through a pipe connected with an air intake chamber 55 in the valve casing 54. Slidably engaged in the valve casing 54 is a valve stem 56 having a valve 57 mounted thereon within the chamber 55. A spring 58 in the chamber 55 acts to hold the valve 57 seated in a valve seat 59 provided within the casing.

The lower end of the air valve stem 56 projects from the lower end of the casing 54 and contacts the short arm 60 of a bell crank 61. The bell crank 61 is pivotally mounted on the machine frame 1 and has a roller 62 rotatably engaged on the end of the long arm thereof.

Journalled in the machine frame bearings 5 and 7 is a cam shaft 63 having a large gear 64 secured on one end thereof in mesh with the driving gear 29 on the main shaft. Also secured on the cam shaft 63 adjacent the inner end of the bearing 7 is a drum 65 having formed on the periphery thereof a V-shaped flange cam 66 clearly disclosed in Figure 9. Mounted on the periphery of the cam drum 65 is a curved plate 67 having a curved cam 68 integral therewith and projecting beyond the inner end of the drum 65 in the path of the roller 62 on the air valve control bell crank 61, as shown in Figure 18. Secured on the cam shaft 63 adjacent the hub of the drum 65 is a collar 69 having integrally formed thereon an outwardly projecting arm 70 on the end of which a roller 71 is rotatably mounted. Rigidly mounted on the cam shaft 63 adjacent the collar 69 is a collar 72 having a cam 73 integrally formed thereon. A guide collar 74 of reduced diameter is mounted on the cam shaft 63 adjacent the cam 73. An enlarged retaining ring or collar 75 is secured to the cam shaft for holding the guide collar 74 in place. Also secured on the cam shaft 63 to the outside of the retaining collar 75 and spaced therefrom is the collar or hub 76 of an eccentric 77. Engaged around the eccentric 77 is a split ring 78 having an eccentric arm or rod 79 integrally formed on one of the ring sections.

The outer end of the eccentric rod 79 is pivotally connected to the upper end of a lever 80, the lower end of which is pivotally engaged on a bolt 81 supported by a bracket 82 which is secured to the front side of the machine frame 1. Integrally formed on the upper end of the lever 80 is a lug or finger 83 positioned between a coiled spring 84 and an adjustable bolt 85 (see Figure 11). One end of the spring 84 is seated in a recess in the lever lug 84, while the other end is seated in a recess provided in a boss 86 integrally formed on one side of the middle portion of a long offset carriage actuating arm or lever 87. Also integrally formed on the same side of the actuating lever 87 is an internally threaded boss 89 for adjustably supporting the screw bolt 85. The mechanism shown in Figure 11 is adapted to take up lost motion. The lower end of the actuating lever 87 is pivotally engaged on the bolt 81. Pivotally connected to the upper end of the lever 87 is one end of a link 90, the other end of which is pivotally connected to a pin 91 supported by a pair of lugs 92 integrally formed on one end of a blank feed carriage 93.

The feed carriage 93 is rigidly secured on a pair of parallel slidable guide rods 94 and 95 which are respectively supported at different elevations to slide in the bearing arms 15 and 16. The upper surface of the carriage 93 is thus held in an inclined position and has secured thereon an inclined movable blank feed table 96 cut away to afford a blank recess 97 corresponding to the shape of a cup body blank hereinafter described.

Pivotally engaged on the pin 12 is the upper end of an inclined yoke frame 98 in which an auxiliary shaft 99 is journalled. Integrally formed on the inner or lower end of the shaft 99 is a frustum-shaped presser roller or cone 100 having an integral beveled pressing flange 101 at the reduced end thereof provided with a beveled surface. Fixed upon the shaft 99 is a beveled gear 102 which meshes with the bevel gear 45 on the drive shaft 63. The teeth of the bevel gears 45 and 102 are extra long to permit the same to remain in driving relation to one another even when they are slightly separated, which occurs when the shaft 99 is swung upwardly to allow a completed cup on the forming cone 33 to be ejected as hereinafter described. The pivotally mounted yoke frame 98 is positioned between the two guide bars 25 to be guided thereby when said yoke frame is swung upwardly and downwardly about the pivot pin 12.

Rigidly secured upon the pivoted yoke frame 98 is a head 103 to which one end of a longitudinally slotted bar or rod 104 is secured. A scraping knife or blade 105 is adjustably engaged in the slotted bar 104 and is held in contact with the peripheral surface of the upper or auxiliary cup forming presser cone 100, by means of an adjusting screw 106 positioned in a box 107 supported on the projecting bar 104. Rigidly bolted to the outer end of the projecting bar 104 is a downwardly directed bracket arm 108 having a finishing presser finger 109 secured thereon adapted to be positioned adjacent the end surface 34 of the main cup forming cone 33 when the yoke frame 98 is in its lowered position, as shown in Figure 5.

Extending transversely through the yoke frame 98 is a shaft or bolt 110 on the projecting ends of which the upper ends of the two connecting rods 44 are pivotally engaged. Also pivotally engaged on the shaft 110 to the inside of the connecting rods 44 are the upper ends of two rods 111. The lower ends of the rods 111 are connected to the upper end of a forked bar 112 which projects downwardly through an opening 113 in the top of the machine frame 1, as shown in Figure 6, and engages over the guide collar 74. Rotatably supported on one side of the forked bar 112 is a roller 114 which is disposed above and in the plane of operation of the cam 73 to cause the yoke frame 98 to be swung upwardly about the pivot pin 12 to move the presser cone 100 away from the main forming cone 33.

Secured on the front side of the machine frame 1 is a bracket 115 having pivotally supported thereon a bell crank member comprising a short arm 116 and a long downwardly and inwardly curved tapered cam arm 117, as shown in Figure 17. A spring 219 is connected to the machine frame 1 and to the short bell crank arm 116. The bell crank cam arm 117 is disposed in the plane of the roller 71 supported on the arm 70 of the cam shaft collar 69, to permit the bell crank 116—117 to be actuated once during each revolution of the cam shaft 63. Pivotally attached to the end of the short bell crank arm 116 is the lower end of a connecting rod 118, the upper end of which is pivotally connected to one end of a short lever 119. The other end of the lever 119 is pivoted on the lower end of the yoke frame 98. Pivoted upon the bracket arm 108 is an arm 120 which is rigidly connected to the lever 119 by means of a hood or shield 121. Rotatably supported on the lever 119 and the arm 120 beneath the shield 121 is a presser roller 122 adapted when lowered to depress the end margin of a cup blank form into contact with an adhesive applying frustum cone 123.

The adhesive applying roller or cone 123 is rotatably supported in a glue or adhesive containing box 124 which is mounted upon the top of one corner of the machine frame 1 at an angle thereto and projecting beyond the edges thereof, as illustrated in Figure 7. A shield or apron 125 is mounted upon the top of the glue box 124 and curves upwardly to project over a portion of the adhesive applying cone 123. A longitudinal opening 126 is thus left in the box 124 exposing a portion of the adhesive applying cone 123, as shown in Figure 19. A hot water or steam chamber 127 is provided in the box 124 around an inner glue holding pot or box 128 which holds the glue. The heat from the chamber 127 serves to keep the glue or other adhesive used in a soft liquid form.

Journalled longitudinally in the boxes 124 and 128 is a shaft 129 having a gear 130 fixed on one projecting end thereof. The gear 130 is in mesh with a small gear 131 which is rigidly secured to one side of a larger gear 132 which in turn is in mesh with the main shaft bevel gear 45 to receive a drive therefrom. The gears 131 and 132 are rotatably supported on a bracket 133 fixed on the top of the machine frame 1. Mounted on the shaft 129 within the inner glue box 128 is a large glue distributing drum or roll 134. Journalled in the glue box 128 is an intermediate roll 135 which is in rolling engagement with both the large glue roll 134 and with the glue applying cone 123, as shown in Figure 19, so that glue from the box 128 is fed by the large roll 134 to the intermediate roll 135 and then to the glue applying cone 123 against which the end margin of each body cup blank is pressed by the presser roll 122.

The inner glue box 128 has an extension which projects through one end of the outer box or housing 124 and has an opening 136 cut therein, as illustrated in Figure 20. Formed on the extension of the glue box 128 is a stationary hub or collar 137 having a notch 138 cut therein. Formed on the extension of the glue box 128 is a cam strip 139. Rotatably engaged on the projecting end of the shaft 129 is the hub 140 of a bell crank 141. The bell crank hub 140 has integrally formed thereon a projecting dog 142 having an inclined edge adapted to coact with an inclined edge of the notch 138. A coiled spring 143 is engaged on the projecting end of the shaft 129 between the bell crank hub 140 and a head 144 fixed on the end of said shaft 129.

Mounted on the short arm of the bell crank 141 is a roller 145 adapted to coact with the cam strip 139 on the extension of the glue box 128. Pivotally connected to the short arm of the bell crank 141 is one end of a rod 146, the other end of which projects through a flange 147 on the carriage 93. A collar 148 is fixed on the projecting end of the rod 146. Engaged around the rod 146 between the carriage 147 and a fixed collar 225 is a coiled spring 226. Rotatably mounted on the long arm of the bell crank 141 is a beveled glue distributing disk 149 adapted when the long arm of the bell crank 141 is in an elevated position to project through the box extension opening 136 into contact with the large glue feed roller 134. Glue is thus supplied to the beveled edge of the disk 149 and is adapted to be applied to a cup bottom blank held against the reduced end of the main forming cone 33.

Figure 4:
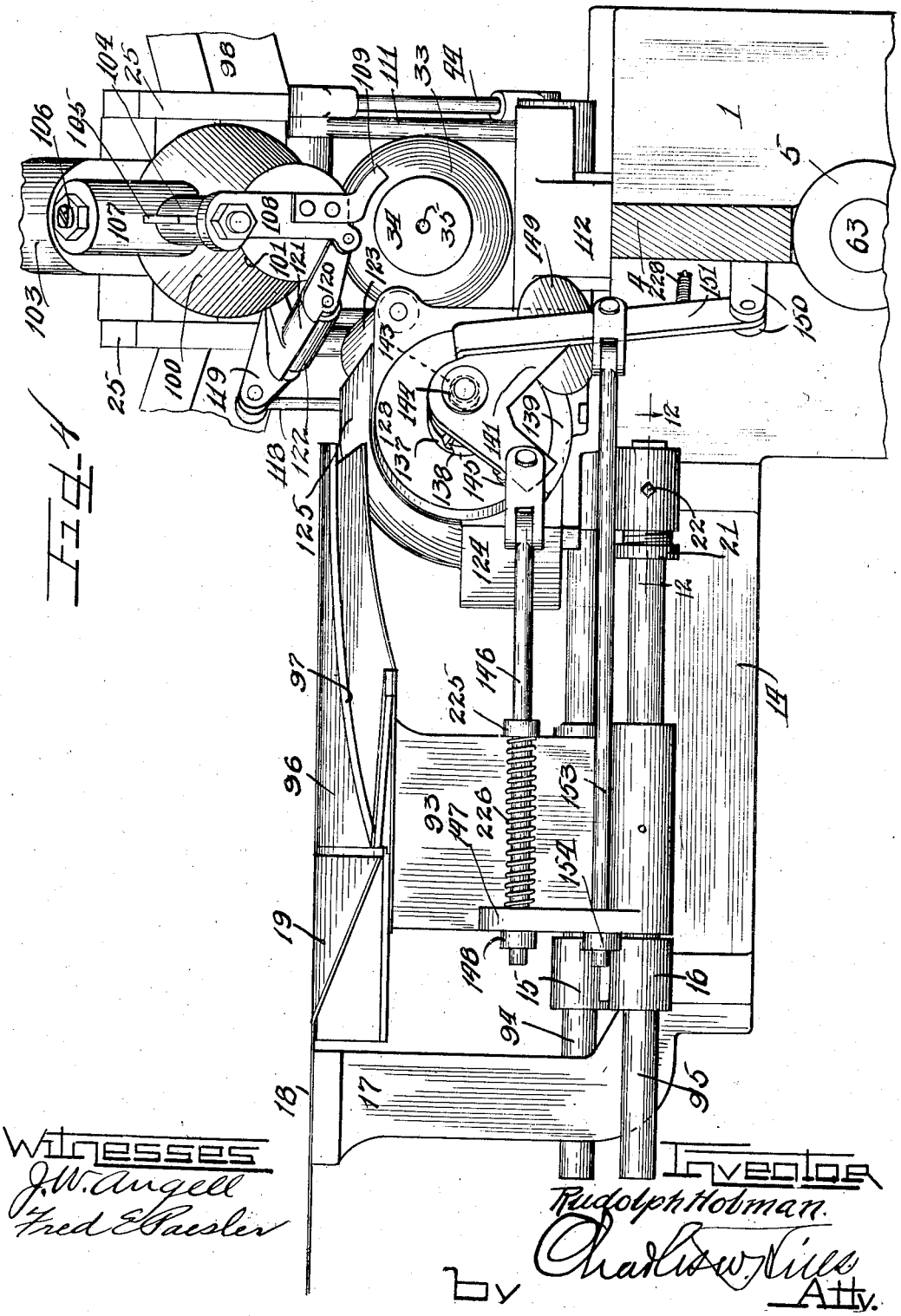
Figure 4 is a sectional view taken on line 4—4 of Figure 1 with parts omitted and with parts broken away.

Rotatably mounted on the front side of the arm 4 of the machine frame 1 is a two arm yoke or U-shaped member 150 supporting a pin on which the lower end of a latch lever 151 is pivotally engaged between the arms of said yoke. A return spring 228 is connected to the lever 151 and to the machine frame. A beveled head or flange 152 is integrally formed at right angles on the upper end of the latch lever 151 to engage over the long arm of the bell crank 141 to hold the bell crank in a tipped or lower position, as shown in Figure 4. Pivotally connected with the latch lever 151 is one end of a connecting rod 153, the other end of which slidably projects through an opening in the carriage flange 147 and has a collar 154 fixed thereon. The connecting rod 153 is longer than the rod 146 so that when the carriage 93 returns from a feeding operation the rod 146 will act to trip the bell crank 141 before the rod 153 will pull the latch lever 151 into locking engagement over the long arm of the bell crank 141.

A cup bottom blank feed mechanism is also provided and is operable by the cam flange 66 on the cam shaft drum 65. Fixed on one of the rear frame legs 2 is a bracket 155 on which is pivotally supported the lower end of a long lever 156 having a return spring 227 engaged with the lower end thereof. Rotatably supported on the inner surface of the lever 156 is a roller 157 positioned in the path of action of the cam flange 66 on the drum 65 so that the lever 156 will be swung back and forth about the lower pivoted end thereof. Pivotally connected to the upper end of the lever 156 is one end of a long operating rod 158. The upper end of the lever projects behind a guide strap 159 secured on the rear side of the machine frame 1 and spaced therefrom by blocks 160.

The other end of the rod 158 is pivoted on a pin 161 supported by apertured lugs 162 which are formed on the lower end of a bolt 163 rotatably engaged through one end of a curved arm 164. Fixed on a projection on the swinging arm 164 is an upwardly projecting finger or bar 165. Integrally formed on the ends of the machine frame arms 3 and 4 are split rings or collars 166 and 167 respectively provided with clamping screws 168. Supported by the clamping rings 166 and 167 is a vertical shaft 169 having a lock ring or collar 170 engaged on a threaded portion thereof above the split ring 166 to hold the shaft 169 in a vertical position of adjustment. Rotatably engaged on the upper projecting end of the vertical shaft 169 is a casting or block 171 rotatably supporting a bolt 172 on the lower end of which the curved arm 164 is engaged. Integrally formed on the block 171 is an extension 173 having a downwardly directed flange 174 on the inner end thereof below a sleeve 175. The sleeve 175 is provided with a chamber 176 and with a transverse bottom blank receiving slot 177. A passage 178 is provided in the block extension 173 and communicates with the sleeve chamber 176.

Slidably engaged in the block extension passage 178 is a stem or plunger rod 179 which projects into the sleeve chamber 176 and has a spring 180 seated in a recess therein. The spring contacts the enlarged inner end of a rotatable pin 181 having a plunger or disk 182 fastened to the outer end thereof, as illustrated in Figure 14. The end of the block 171 below the passage 178 is slotted to permit a screw pin 183 secured to one end of the plunger stem 179 to project from the block and have one end of a link 184 pivoted thereon above a channel member or fork 185. Pivoted to the other end of the link 184 is one end of a link 186, the other end of which is pivoted to an extension 187 integrally formed on the block 171. Pivoted on a bolt 188 on the curved arm 164 is one end of a forked link 189 which is pivoted to the link 186 intermediate the ends thereof.

Pivoted on a pin supported by the fork 185 is one end of a short link 190, the other end of which is pivoted to the lower end of a fulcrumed beam 191 which is pivoted intermediate its ends on an arm 192 integrally formed on the outer end of the block 171. Pivoted to the upper end of the fulcrumed beam 191 is one end of a short link 193, the other end being pivotally connected to a block 194. The block 194 is fixed upon the outer projecting end of a slidable cup bottom blank feed plate 195 which is slidable in a longitudinal guide recess 196 formed in the top surface of the block 171 and the block extension 173. Secured upon the top of the block 171 and the extension 173 is a cover and guide plate 197 cut out at 198 to receive the feed plate block 194. The cover plate 197 is also provided with a circular opening 199 below the base plate 200 of a bottom blank holding tube or magazine 201 which is rigidly fixed upon the cover plate 197 by screws or other suitable means. The blank tube 201 is adapted to hold a stack of circular cup bottom blanks 202 made of paper or other suitable material with the lowermost blank resting in the groove 196 of the block extension 173 in advance of the blank feed plate 195.

Integrally formed transversely on the block webb plate or flange 174 is a bearing sleeve 203 in which a shaft or pin 204 is journalled. Fixed on one projecting end of the pin 204 is one end of a radially directed arm or lever 205 having a roller 206 rotatably mounted on the outer end thereof adjacent the latch lever 151, as illustrated in Figures 23 and 24, to permit release of the latch lever from locking engagement with the bell crank 141. Secured on the opposite extending end of the pin 204 is a second radially extending arm or lever 207 directed substantially opposite to the arm 205. A pin 208 is supported on the end of the arm 207 and has rotatably engaged thereon a grooved or double inwardly beveled presser disk 209. Also pivoted to the pin 208 is the forked end 210 of a slide rod 211 which slidably projects through an apertured bracket 212 fixed on one side of the block extension 173. The end of the rod 211 is positioned in the path of operation of the finger 165 mounted on the swinging arm 164. A collar 213 is fixed on the rod 211 to afford a stop for one end of a coiled spring 214 engaged around the rod 211 and contacting the bracket 212. Secured on one side of the machine frame arm 4 is a stop pin 215 for limiting the swing of the block 171 in one direction. Fixed on the other side of the arm 4 is an upright plate 216 having a screw bolt 217 projecting therethrough to afford a stop for limiting the movement of the block 171 in the opposite direction. A lock nut 218 is engaged on the stop screw bolt 217 to hold the same locked in a set position.

As illustrated in Figure 28, the cup is formed from a cup body blank 220 having concentric outer and inner edges 221 and 222 and radial side margins 223. The inner margin of the blank 220 is provided with slits to form a plurality of tabs 224.

The operation is as follows:

A belt trained around the loose pulley 27 and driven from any suitable source of power is adapted to operate the machine when the driving pulley 28 is locked with the pulley 27 by means of a suitable clutch mechanism, or if preferred by shifting the belt from the loose pulley 27 onto the driving pulley 28. The main shaft 26 is thus rotated thereby causing the gear 29 thereon to rotate the large gear 64 and the cam shaft 63 supporting the same. The beveled gear 45 on the main shaft being in mesh with the beveled gear 102 acts to rotate the auxiliary shaft 99 and the frustum presser cone 100 on the end thereof. The main forming frustum cone 33 is rotated with the main shaft 26. The cup forming cones 33 and 100 at the start of a cup forming operation are separated due to the action of the cam 73 on the roller 114 of the yoke member 112. The teeth of the bevel gears 45 and 102 are of such a length that they are always in mesh even when the pivoted frame 98 is swung upwardly to separate the forming cones 33 and 100.

A stack of round cup bottom blanks 202 are placed in the blank holder tube 201 with the lowermost blank seated within the guide recess 196 of the block 171 in advance of the slidable feed plate 195. A stack of cup body blanks 220 are placed on the stationary table 18 to permit the same to be manually fed one at a time into the depression 97 of the movable table 96 when said table is in a retracted position, as shown in Figure 4.

Just previous to the ejection of a formed cup from the machine the cam 66 on the cam shaft 63 comes into engagement with the roller 157 on the lever 156 thereby causing the lever 156 to swing toward the feeding end of the machine, thus pushing the rod 158 which acts to swing the block 171 and its extension 173 about the shaft 169 into the position shown in Figure 16 against the stop 215 and away from in front of the main forming cone 33 to permit a formed cup to be ejected from the cone 33.

With the continued movement of the cam 66 against the roller 157 the rod 158 continues to push against the curved arm 164 causing the same to move about the pivot 172 from the full line position of Figure 16 into the dotted line position. As the curved arm 164 starts to swing into the full line position of Figure 16, the spring 214 acts to retract the presser disk 209 and at the same time partially retracts the plunger rod 179 and the plunger head 182. Inasmuch as the friction between the plunger rod 179 and the block extension 173 is greater than the friction between the block 171 and the vertical pivot shaft 169, the curved arm 164 and the block 171 move together until the block extension 173 strikes the stop 215. The curved arm 164 now swings about its pivot 172 causing the pivotally connected links 189, 186 and 184 to retract the plunger rod 179 and the plunger 182 secured to the end thereof. The plunger 182 is thus retracted beyond the slot 177 in the sleeve 175. Simultaneous with the retraction of the plunger the forked pin 183 secured to the plunger rod acts on the link 190 thereby swinging the beam 191 about its pivot to move the upper link 193 inwardly. The link 193 acts to push the feed plate 195 inwardly thereby causing the same to engage the lowermost bottom blank 202 which is seated in the guide recess 196 of the block extension 173. The lowermost bottom blank 202 is thus pushed out of the guide recess and drops by gravity through the slot 177 into the sleeve 175 in front of the plunger 182.

As the blank 202 is started to be ejected by the feed plate 195 and as the block 171 engages against the stop 215, the feed table 96, carrying a cup body blank 220, starts to feed inwardly toward the forming cones. The eccentric 77 on the shaft 63 causes the eccentric arm 79 to swing the lever 80 thereby causing the long lever 87 to swing toward the machine frame. The inward movement of the lever 87 acts to feed the movable inclined table 96 inwardly.

As the roller 157 comes into contact with the second half of the cam 66 the lever 156 is pulled back by the action of the spring 227 thereby causing the rod 158 to pull the block 171 and the curved arm 164 together about the pivot shaft 169 thus swinging the block extension 173 into alignment with the main forming cone 33 and against the adjustable stop 217, as illustrated in Figure 23. When the block 171 contacts the stop 217, the table 96 is advanced half its distance and the latch lever 151 is in position to lockingly engage the bell crank 141.

With the continued retraction of the rod 158 the curved arm 164 is now swung about its pivot 172 thereby actuating the link mechanism forcing the plunger rod 179 outwardly and simultaneously retracting the bottom blank feed plate 195. The bottom blank 202 within the sleeve 175 is thus forced outwardly by the plunger head 182 into contact with the end surface 34 of the main forming cone 33 covering the end of the outlet passage 35 therein. The spring 180 in the plunger rod 179 serves to hold the plunger head 182 in resilient contact with the bottom blank 202 to hold the same tightly against the end surface 34 of the main forming cone 33.

The curved arm 164 in swinging into the position shown in Figure 15 brings the bar 165 into contact with the end of the rod 211 thereby causing the same to slide the double beveled presser disk 209 into engagement with the outer margin of the bottom blank 202 on the end of the main forming cone 33. Movement of the rod 211 toward the main forming cone 33 causes the lever 207 to rock or partially rotate the pin 204 thus causing the lever 205 to swing toward the latch lever 151 to move said latch lever out of locking engagement with the bell crank 141 against the action of the spring 228. The spring 226 acts to swing the bell crank 141 upwardly into the position shown in Figure 5 to cause the disk 149 to apply adhesive to the margin of the cup bottom blank 202. As the bell crank 141 swings upwardly and moves inwardly the beveled glue distributing disk 149 is projected through the slot 136 of the glue box extension into rolling contact with the main glue roller 134 and has the beveled surface coated with glue. The advance end of the glued portion of the bottom blank is moved about one-fourth of a turn before the pressing cone 100 is lowered as hereinafter described. At this point in the operation, the table 96 is in its innermost position against the stop 21 as shown in Figure 5. The projecting end of a cup body blank 220 seated in the recess 97 of the movable table 96 has thus been fed inwardly between the rotating forming cones 33 and 100. When the pressing cone 100 is lowered, the advance end of the blank 220 is gripped tightly between the forming cones and by the gripping finger 38. The forming cones act to roll the blank about the main forming cone 33. As the blank 220 is projected between the forming cones and as the pivoted frame 98 is lowered the bell cranks 43 are swung away from the slidable beveled collar 36 thus permitting the compressed springs 37 to push the collar away from the cone 33 whereby the gripping finger 38 is moved into contact with the margin of the blank 220 to hold the same in position on the cone 33. The inner or enlarged end of the upper forming cone 100 is provided with a notch or depression 229 to permit the gripping finger 38 to engage a blank on the lower forming cone 33.

As the cam 73 moves out of engagement with the roller 114 on the forked bar 112, the auxiliary frame 98 together with the auxiliary shaft 99 swings downwardly by gravity about the pivot 12 bringing the auxiliary cup forming cone 100 into rolling contact with the main forming cone 33. The bars 25 serve as guides for the pivoted frame 98 whereby the cone 100 is kept directly above the cone 33.

As soon as the advance end of the cup body blank 220 is fed between the forming cones 33 and 100 and is gripped by the gripping finger 38, the eccentric mechanism acts to retract the table 96.

It will thus be noted that as the body blank 220 is being rolled around the bottom forming cone 33, a coating of glue is applied to the outer margin of the bottom blank 202, while the beveled flange 101 of the cone 100 bends the tabs 224 inwardly and presses the same against the glued margin of the blank 202 to pass beneath the auxiliary or intermediate presser finger 109 which also acts to press the bent tabs 224 against the glued margin of the bottom blank 202. After the action of the finger 109 on the tabs 224 takes place, the double beveled presser disk 209 rolls over the bent tabs and presses the same tightly against the glued margin of the cup bottom blank 202. While one beveled surface of the presser disk 209 acts on the tabs 224 the other beveled surface thereof rolls on the outer surface of the lower end of the cup being formed, as illustrated in Figure 15, which shows the position of the disk 209 when in operating position. The presser disk 209 acts to produce a smooth circular bottom edge at the bent portion of the tabs 224 by upsetting the material at the inner end of the tab slots to produce a liquid tight joint. When the bottom blank 202 has been rotated about three-quarters of a turn and the presser devices have pressed about three-fourths of the tabs 224 against said glued bottom blank, the table 96 has been retracted about half way.

Just previous to the time that the last end of the cup body blank 220 is drawn between the forming cones 33 and 100 the arm 70 on the crank shaft 63 brings the roller 71 thereon into rolling contact with the long curved bell crank arm 117 shown in Figure 17. The bell crank arm 117 is thus swung outwardly while the short bell crank arm 116 is swung downwardly thereby causing the connecting rod 118 to pull downwardly on the lever 119. The roller 122 supported on the levers 119 and 120 is thus momentarily swung downwardly from the position shown in Figure 4 into the position shown in Figure 27 to press the under surface of the end margin of the moving cup body blank 220 downwardly against the glue applying roller 123. When the roller 122 acts to depress the end margin of the cup body blank 220 the end of the guard or apron 125 serves to hold up the edge of said cup body blank 220 to permit the glue to be applied only along the center portion of the trailing margin of the cup body blank. As soon as this action occurs the roller 71 moves out of engagement with the bell crank arm 117 thereby permitting the compressed spring 219 to swing the lever 119 and the roller 122 upwardly, back into the release position of Figure 4. The glue applying roller 123 is supplied with glue by the intermediate roller 135 which is in rolling contact with the main glue roller 134, as illustrated in Figure 19. When the carriage has traveled back about half its distance of travel the flange 147 of the returning carriage 96 first contacts the collar 148 on the short rod 146 to commence to pull the bell crank 141 downwardly into the position shown in Figure 4, after which the carriage flange 147 reaches the collar 154 on the longer rod 153 thereby acting to pull the latch lever 151 against the action of the spring 228 into an out of the way position out of the path of discharge of a cup.

The glued margin of the cup body blank 220 is thus drawn between the forming cones and the glued side thereof is tightly pressed, by the upper cone 100, against the outer surface of the advance margin of the cup body blank 220 to complete the forming of the flat bottomed cup on the lower forming cone 33. As illustrated in Figure 30, the tabs 224 are pressed against the glued portion of the cup bottom 202 in overlapping relation. It will also be noted that the glued overlapping margins of the cup body blank 220 form a substantially straight, parallel edged seam.

Just before the table 96 reaches its outer position, the roller 157 on the lever 156 comes into contact with the cam 66 to cause the rod 158 to move the curved arm 164 away from the end of the rod 211 thus permitting the spring 214 on the rod 211 to act against the frame arm 212 to retard the motion of the block 171 until the curved arm 164 swings a short distance to cause the plunger 179 to be retracted a short distance whereby the disk 182 is moved away from the bottom of the formed cup on the cone 33 to clear the same to permit the block 171 to be swung outwardly without injury to the bottom of the cup. At the same time that the rod 158 starts to act on the curved arm 164, the spring 214 also acts to pull the presser disk 209 away from the forming cone 33. The rod 158 continues to act on the curved arm 164 to swing the block 171 and its extension 173 from the position illustrated in Figure 15, away from in front of the main forming cone 33, against the stop 215 into the position shown in Figure 16. Just before the block 171 comes into contact with the stop 215, the cam 68 on the drum 65 reaches the roller 62 on the bell crank 61, as shown in Figure 18 just at the time that the advance end of the cam 73 comes in contact with the roller 14. The cam surface 73a (Figure 17) acting on the roller 114 acts to swing the frame 98 upwardly about the pivot pin 12. The pressing cone 100 is thus moved away from the forming cone 33. Upward movement of the pivoted frame 98 also causes the rods 44 to swing the bell cranks 43 thereby pushing the collar 36 toward the cone 33 to swing the gripping finger 38 out of engagement with the formed cup. The continued advance of the cam 68 acts to swing the bell crank 61 so that the short bell crank arm 60 swings upwardly against the valve stem 56. The air valve 57 is thus opened permitting compressed air from the valve intake chamber 55 to flow into the valve outlet chamber 53 and out through the discharge pipe 52. The compressed air thus escapes into the chamber 47 of the air jacket or sleeve 46 from which the air passes through the shaft passage 48 out through the axial shaft passage 35 against the bottom of the completed cup on the forming cone 33. The completed cup is thus blown from the forming cone 33 and may be manually removed or allowed to drop by gravity in a suitable chute and then into a container if so desired.

The scraping blade 105 is provided for the purpose of scraping the surface of the upper forming cone 100 in order to remove any glue which may have been deposited thereon and squeezed from between the overlapping seam forming ends of the cups.

The distance of travel of the reciprocating carriage 93 and the table 96 thereon is always the same. The table however may be made to stop at different distances from the forming cone 33 to locate the center of curvature of the cup body blank at the apex of the forming cones. This adjustment of the table is accomplished by adjusting the threaded sleeve 21 in the respective rod supporting member 16 when the set screw 22 is released from the locking position shown in Figure 12, and also adjusting the set screw 85 shown in Figure 11.

In order that the plunger 182 may be properly aligned with the main forming cone 33 on the shaft 26, the adjustable stop screw 217 is provided to limit the swing of the block 171 and its extension 173 in one direction. The stop 215 limits the swing of the block 171 and its extension 173 in the opposite direction before the curved arm 164 starts to swing from the full line position of Figue 16 to the dotted line position shown in the same figure.

Figure 11 illustrates in detail an adjustable mechanism whereby lost motion between the levers 80 and 87 may be taken up by the coiled spring 84. The spring 84 is started to be compressed at the time that the carriage 93 comes into contact with the stop sleeve 21. With this arrangement of the feed table 96 is held stationary a short time to permit the advance end of the cup body blank to be gripped by the forming cones.

Just previous to the time that a completed cup has been blown from the forming cone 33 the cycle of operations starts to repeat itself in order to form another cup. A cycle of operation starts when the roller 157 is partly advanced on the cam 66 shortly before the time that a completed cup is discharged from the cone 33. The cycle of operation takes place during one evolution of the cam bearing shaft 63. Due to the 3 to 1 ratio between the large gear 64 and the small drive gear 29, the small gear 29 is rotated three times during each revolution of the large gear 64. Inasmuch as the bevel gears 45 and 102 are of the same size, the two forming cones 33 and 100 are rotated at the same rate of speed.

The bottom blanks 202 in the holder 201 drop by gravity after each ejection of the lowermost blank in the stack by the slidable feed plate 195. The cup body blanks 220 are manually pushed from the stationary table 18 down over the stationary inclined apron 19 into the recess 97 of the inclined reciprocating table 96 when said table 96 is in a retracted position. When a cup body blank 220 is seated in the table recess 97, the advance end of said blank projects beyond the advance edge of the table.

By referring to Figure 7, it will be noticed that the main glue supply roll 134 is rotated in the glue pot or box 128 by the shaft 129 which is driven through the gears 130, 131 and 132 by the gear 45 on the main shaft 26. Since the bell crank hub 140 is loosely engaged on the shaft 129 the bell crank is partially rotated and simultaneously pushed outwardly against the spring 143 when the bell crank 141 is swung into the lowered position shown in Figure 4 by the action of the carriage flange 147 on the collar 148 of the rod 146. Rotation and outward movement of the bell crank 141 is caused by the bell crank roller 145 acting on the stationary cam 139 and by the dog 142 on the bell crank hub 140 sliding out of the notch 138 in the stationary collar 137 thereby moving the bell crank out of clutching relation with the collar 137. With the release of the latch lever 151 the bell crank 141 is swung upwardly by the action of the spring 226 until the dog 142 reaches the notch 138 when the spring 143 acts to push the bell crank inwardly on the shaft 129 into clutching relation with the stationary collar 137.

Attention is directed to the bottom blank feed plunger 182 which if desired may be provided with letters or other symbols to stamp or print the cup bottoms with names, trade marks or other advertising matter.

While an arrangement is disclosed for feeding previously formed cup bottoms against the end of the forming cone 33, it will be understood that a die and punch mechanism may be readily installed in the block 171 and the block extension 173 to punch out cup bottom blanks 202 from a strip of material fed across or into the sleeve chamber 176.

I am aware that numerous details of construction may be varied through a wide range without departing from the principles of this invention, and I therefore do not purpose limiting the patent granted otherwise than necessitated by the prior art.

I claim as my invention:

1. In a machine for forming a cup from suitably cut blanks, a pair of conical frustum rollers comprising a forming roller and a pressing roller adapted to engage a cup body blank between them with a portion of said cup body blank projecting beyond one end of said forming roller, mechanism for rotating said rollers, means for engaging the body blank to hold the same in position on said forming roller, means for holding a cup bottom blank against one end of the forming roller, and presser means formed on said pressing roller adapted to bend the projecting edge of said cup body blank over against the cup bottom blank.

2. In a machine for forming a cup from suitably cut blanks, a pair of frustum rollers comprising a forming roller and a pressing roller adapted to engage a cup body blank between them with a portion of the cup body blank projecting beyond one end of the forming roller, mechanism for rotating said rollers, automatically operated means for holding a cup bottom blank against one end of the forming roller, means for applying a marginal ring of adhesive to the cup bottom blank, and presser means formed on said pressing roller adapted to fold the projecting edge of said cup body blank over against the ring of adhesive on said cup bottom blank.

3. In a machine for forming a cup from suitably cut blanks, a pair of rollers comprising a forming roller and a pressing roller adapted to engage a blank between them with an edge of the blank projecting beyond one end of the forming roller, means on said forming roller for holding the blank in position during a forming operation, and means on the pressing roller adapted to bend the projecting edge of the blank over against the end of said forming roller.

4. In a machine for forming a cup from suitably formed blanks, a pair of rollers adapted to engage a cup blank between them with one edge of said blank projecting beyond one end of one of said rollers, means for driving said rollers, a gripping member supported on one of said rollers for engaging and holding the blank in position, and beveled means integrally formed on the other roller for bending the projecting edge of said blank over against the end of said first mentioned roller.

5. In a machine for forming cups from suitably formed blanks, a pair of frustum rollers comprising a forming roller and a pressing roller adapted to engage a blank between them with a portion of the blank projecting beyond one end of the forming roller, mechanism for rotating said rollers, a beveled flange on said pressing roller adapted to bend the projecting portion of said blank, means for scraping the surface of said pressing roller, and means for separating said rollers after a bending operation by said beveled flange.

6. In a machine for forming flat bottomed cups from suitably formed blanks, a pair of rollers comprising a frustum forming roller and a frustum pressing roller adapted to co-operate to wrap a cup body blank upon the forming roller with a portion of said cup body blank projecting beyond one end of said forming roller, means for rotating said rollers, a magazine for containing cup bottom blanks, means for delivering a cup bottom blank from said magazine against one end of the frustum forming roller, means for applying adhesive to the cup bottom blank while it is held against the end of the forming roller, and means for bending over and pressing the projecting portion of the cup body blank against the adhesived portion of said cup bottom blank.

7. In a machine for forming flat bottomed cups, a pair of rollers comprising a forming roller and a pressing roller, means for operating the rollers, a magazine for containing cup bottom blanks, means for discharging a bottom blank from said magazine, a slotted sleeve for receiving the discharged bottom blank, a plunger mechanism in said sleeve adapted to project the bottom blank from said sleeve into contact with one end of said forming roller, said rollers adapted to co-operate to wrap a cup body blank upon the forming roller and around the edge of the bottom blank held thereagainst, and means for bending and pressing one end of the wrapped body blank against the bottom blank.

8. In a machine for forming flat bottomed cups, a frustum forming roller, means for feeding and holding a cup bottom blank against one end of the forming roller, means for wrapping a cup body blank around said forming roller with a portion projecting beyond the cup bottom blank, and means for bending and pressing the projecting portion of the cup body blank against the cup bottom blank.

9. In a machine for forming flat bottomed cups, a frustum forming roller, a magazine for holding a stack of cup bottom blanks, a mechanism for discharging a cup bottom blank from said magazine, a slotted sleeve for receiving the discharged cup bottom blank, and reciprocating means in said sleeve for projecting and holding the discharged cup bottom blank against one end of the forming roller.

10. In a machine for forming a flat bottomed cup from prepared blanks, a pair of rotatable frustum shaped rollers, a plunger mechanism adapted to project and hold a cup bottom blank against one end of one of said rollers, and a reciprocating feeding means adapted to transfer a cup body blank to the rollers to permit the rollers to wrap and fold the cup body blank around the margin of the cup bottom blank.

11. In a machine for forming a flat bottom cup, a rotatable frustum forming roller, a slidable plunger rod, means for reciprocating the same, a rotatable plunger head on said rod, and means for automatically feeding a cup bottom blank in front of the plunger head when the plunger rod is retracted, said plunger head adapted to hold the cup bottom blank in contact with one end of the forming roller.

12. In a machine for forming flat bottomed cups, a rotatable forming roller having a flat end surface, a slotted sleeve adapted to receive a cup bottom blank, a plunger in said sleeve, and means for operating said plunger to cause the same to project the bottom blank from the sleeve into contact with the flat end of the forming roller.

13. In a machine for forming cups from suitable blanks, forming rollers, automatic means for moving and holding a cup bottom blank against one end of one of the forming rollers, and a feeding means adapted to feed a cup body blank to the forming rollers to permit said blank to be formed around the cup bottom blank and the roller contacted thereby.

14. In a cup forming machine, the combination with a forming roller, of a pressing roller adapted to coact therewith and having a beveled bending flange integrally formed on one end thereof.

15. In a machine for forming flat bottomed cups from blanks, a pivotally mounted feeding means for the cup bottom blanks, means for swinging the same into a feeding position, a feeding means for the cup body blanks, and coacting forming means for receiving said blanks and forming the cup body blank around the cup bottom blank.

16. In a machine for forming flat bottomed cups from blanks, a feeding means for holding a cup bottom blank in position, a feeding means for a cup body blank, a forming mechanism, and a discharge means for the cup, said forming means including a pair of rollers one of which is provided with a flange for bending a portion of the cup body blank over against the cup bottom blank.

17. In a machine for forming paper cups from blanks, a pair of rollers comprising a forming roller and a pressing roller, a pivoted bearing for said pressing roller, means for rotating said rollers, means for feeding a blank between the rollers whereby the blank is wrapped around the forming roller, a glue applying roller, an auxiliary roller pivotally supported on the pivoted bearing, and means for swinging the auxiliary roller into contact with the trailing end of the blank to press the same against the glue roller before the trailing end of the blank is pressed against the advance end of the blank by the pressing roller.

18. A paper cup former comprising upper and lower rollers, means for rotating said rollers, means supporting the upper roller to permit the same to be swung away from the lower roller, a rotatable shaft, a guide collar thereon, a forked member pivoted to said upper roller supporting means adapted to engage over said guide collar to be guided thereby, a roller on said forked member, and a cam on said shaft adapted to engage the roller on the forked member to push the forked member upwardly to lift the upper roller away from the lower roller.

19. A paper cup former comprising a forming roller, driving means for rotating the same, a presser roller, a frame supporting the presser roller mounted to swing toward and from the forming roller, a shaft operated by the driving means, a member pivotally connected to said frame, a roller on said member, a cam on said shaft for engaging the roller on said member for swinging the frame upwardly to move the presser roller away from the forming roller, ejecting means for a cup connected with the forming roller, and a second cam on said shaft adapted to operate the ejecting means to cause a completed cup to be ejected when the presser roller moves away from the forming roller.

20. In a machine for forming paper cups from blanks, a pair of rollers comprising a relatively fixed forming roller and a pivotally mounted pressing roller adapted to engage a cup body blank between them, a mechanism for rotating said rollers, a shaft adapted to be rotated by said mechanism, a feed mechanism adapted to feed a cup bottom blank into the field of operation of the pair of rollers, a drum on said shaft, a cam on said drum, means operated by said drum cam for actuating the cup bottom blank feed mechanism, means operable from the shaft for moving the pressing roller away from the forming roller after a cup has been formed, a cup ejecting mechanism connected with said forming roller, and a second cam on said drum adapted to actuate the ejecting mechanism to cause discharge of a completed cup from the forming roller when the pressing roller is moved away from said forming roller.

21. In a paper cup forming machine, the combination of a main driving shaft, a forming roller thereon, a cup ejecting mechanism connected with the forming roller, a pivotally supported shaft, a pressing roller thereon, a third shaft driven from said main shaft, means operable from the third shaft to cause the pressing roller to move away from the forming roller after a cup has been completed, and a cam on said third shaft adapted to actuate the ejecting mechanism to eject a cup from the forming roller.

22. In a paper cup forming machine the combination of a driving shaft, two shafts driven thereby at different rates of speed, a cup forming member fixed on said driving shaft, a pressing member fixed on one of said shafts, means mounted on the driving shaft and on said forming member for releasing a formed cup from the cup forming member, and means on the other of said shafts for moving the pressing member away from the forming member to permit discharge of a completed cup.

23. In a paper cup forming machine the combination with a pair of coacting cup forming members, a driving shaft supporting one of said forming members, an auxiliary shaft driven by the driving shaft and supporting the other of said forming members, a third shaft driven by said driving shaft, a feed table, and an eccentric mechanism on said third shaft for reciprocating the feed table to feed blanks to said forming members at predetermined intervals.

24. In a paper cup forming machine the combination with a pair of coacting cup forming members, of a driving shaft supporting one of said forming members, a pivotally supported auxiliary shaft driven by the driving shaft at an equal speed and supporting the other of said forming members, a third shaft driven by said driving shaft at a slower rate of speed, a blank feed table, an eccentric mechanism on said third shaft for reciprocating the feed table to feed blanks to said forming members at predetermined intervals, a mechanism associated with the auxiliary shaft, and a cam on said third shaft for actuating said mechanism to cause the forming members to separate at predetermined times to permit completed cups to be discharged.

25. In a paper cup forming machine, a pair of cup forming members comprising a forming member and a pressing member, a driving shaft supporting said forming member, a pivoted frame, an auxiliary shaft supported thereby and supporting the pressing member, gear means for driving the auxiliary shaft from said driving shaft at the same rate of speed, a third shaft connected to be driven by the driving shaft at a slower rate of speed, a cup bottom blank feed mechanism, a feed table for feeding cup body blanks, a cam on said third shaft for actuating said cup bottom blank feed mechanism at predetermined times to feed cup bottom blanks to said forming member, an eccentric mechanism on said third shaft for reciprocating the feed table to feed cup body blanks to the forming members at predetermined times, a forked mechanism connected to said pivoted frame, a cam on said third shaft coacting with the forked mechanism at predetermined times to cause separation of the pressing member from the forming member after a cup has been completed, a cup ejecting mechanism connected with the forming member, and a cam on said third shaft for operating the ejecting mechanism when the forming members are separated to cause the ejection of a completed cup from the forming member.

26. A paper cup forming machine comprising a forming member and a pressing member, a drive shaft supporting the forming member, a pivoted frame, an auxiliary shaft supported thereon supporting the pressing member and adapted to be driven by said driving shaft at the same rate of speed, a cam shaft connected to be driven by the driving shaft at a reduced rate of speed, a cup bottom blank feed mechanism, a feed table for cup body blanks, a drum on said cam shaft, a cam on said drum for actuating said cup bottom blank feed mechanism at a predetermined time to feed a cup bottom blank against one end of the forming member, an eccentric on said cam shaft for reciprocating the feed table to feed a cup body blank between the forming member and the pressing member at a predetermined time, a glue distributing mechanism, means operable by the feed table adapted to coact with the glue distributing mechanism to apply glue to the cup bottom blank on the forming member, a roller supported on said pivoted frame, a spring controlled bell crank connected with said roller, an arm on said cam shaft adapted to actuate the bell crank to cause the roller to move into engagement with one end of the cup body blank to push the same into engagement with the glue distributing mechanism to permit the overlapping end margins of the cup body blank to be glued together, means for pressing a portion of the cup body blank against the glued portion of the cup bottom blank to form a completed flat bottom cup, a pivoted mechanism hanging from the pivoted frame, a cam on said cam shaft for actuating the pivoted mechanism to cause the pressing member to move away from the forming member, a cup gripping mechanism for holding a cup in position adapted to be released when the pressing member is separated from the forming member, an air valve mechanism connected with the forming member, and a second cam on said cam shaft drum adapted to operate the air valve mechanism at a predetermined time to cause the completed cup to be ejected from the forming member.

27. In a flat bottomed cup forming machine the combination with a forming roller and a pressing roller, of means for feeding and holding a bottom blank against one end of the forming roller, a feed mechanism for supplying a body blank between the forming roller and the pressing roller, means for applying an adhesive to the bottom blank and to the body blank, and mechanism for bending and pressing portions of the body blank against the bottom blank to form a completed flat bottomed cup.

28. In a cup forming machine the combination with a forming roller, of means for feeding and holding a bottom blank against the forming roller, a feed mechanism for supplying a body blank to the forming roller, mechanisms for applying adhesive to the bottom blank and to the body blank at predetermined times, presser mechanisms for bending and pressing parts of the body blank against the adhesived portion of the bottom blank, and means for pressing the adhesived portion of the body blank to a margin of said body blank to form a completed cup.

29. In a cup forming machine the combination with a forming member, of means for feeding and holding a cup bottom blank against the forming member, a feed mechanism for feeding the advance margin of a cup body blank into the field of operation of the forming member, means for applying an adhesive to a portion of the cup bottom blank, means for applying an adhesive to the trailing margin of the cup body blank, mechanisms for bending and pressing a portion of the cup body blank against the adhesived portion of the cup bottom blank, a pressing member coacting with the forming member to press the adhesived trailing margin of the cup body blank against the advance margin thereof to form a completed flat bottomed cup, means for separating the pressing member from the forming member, and means for ejecting the completed cup.

30. In a cup forming machine a forming member, pivotally supported means for feeding and holding a cup bottom blank against the forming member, a feed mechanism for feeding the advance margin of a cup body blank into the field of operation of the forming member, means for applying an adhesive to a portion of the cup bottom blank, means for applying an adhesive to the trailing margin of the cup body blank, a pressing member coacting with the forming member to press the adhesived trailing margin of the cup body blank against the advance margin thereof, means formed on the pressing member for bending portions of the cup body blank toward the cup bottom blank, pressing mechanisms for pressing the bent portions of the cup body blank against the adhesived portion of the cup bottom blank to form a completed cup, means for swinging the cup bottom blank feeding means away from the forming member when a cup is completed, and means for ejecting the cup from the forming member.

31. In a cup forming machine a forming member, a pressing member coacting therewith, a pivotedly supported mechanism for feeding and holding a cup bottom blank against the forming member, a feed mechanism for feeding a cup body blank between the forming member and the pressing member, means adapted to act to render the cup bottom blank and the cup body blank adhesive, means formed on the pressing member to bend portions of the cup body blank toward the cup bottom blank, stationary and moveable members for pressing the bent portions of said cup body blank against the cup bottom blank to form a completed cup, means for swinging the cup bottom feeding mechanism and the pressing member away from the forming member, and means for ejecting the completed cup.

32. In a machine of the class described, the combination with cup forming means, of a slidably mounted blank feeding means to supply formed blanks to said forming means, a pivotedly mounted blank feeding means also adapted to feed formed blanks to said forming means to permit flat bottomed cups to be formed, and mechanisms for retracting the slidable feeding means and swinging the pivoted feeding means away from the forming means to permit completed cups to be removed from the forming means.

33. In a cup forming machine the combination with a frustum shaped forming cone, of rotatable means for holding a blank against one end of said cone and means for swinging said rotatable means into and out of alignment with the forming cone.

34. In a cup forming machine the combination with a frustum forming cone, of a pivotally mounted frustum presser cone coacting therewith, and means for feeding and holding a blank against one end of said forming cone during a cup forming operation.

35. In a cup forming machine the combination with a tapered forming roller, of a stationary support therefor, reciprocating means adapted to swing in a horizontal plane into alignment with the forming roller for feeding a cup blank against one end of said roller, and a rotatable member supported on said means for holding the blank in place against said roller during a cup forming operation.

36. In a cup forming machine the combination with a forming roller, of a pivotedly mounted member, a plunger slidably engaged therein, means for swinging said member into the plane of said roller and projecting said plunger to feed a cup blank into the field of operation of said roller.

37. In a cup forming machine the combination with a cup forming frustum cone, of a pivoted member, a plunger rod therein, a rotatable plunger head supported by said plunger rod, and means for projecting said plunger rod to cause a cup blank to be projected against said frustum cone and held in place by the rotatable plunger head during a cup forming operation.

38. In a cup forming machine the combination with a cup forming member, of a pivoted block, a sleeve integrally formed thereon having a slot therein, a plunger in said block projecting into said sleeve, means for feeding a cup blank into said sleeve through said slot when the plunger is retracted, and means for projecting said plunger through said sleeve to cause the blank to be projected from the sleeve and held against the cup forming member.

39. In a cup forming machine the combination with a cup forming member, of a pivoted block, a cup blank holder on said block, a slotted sleeve on said block, a plunger in said block projecting into said sleeve, means for discharging a blank from said holder into the slotted sleeve when the plunger is retracted, and means for swinging said block into alignment with said forming member and projecting said plunger to cause the blank in said sleeve to be projected therefrom and held against the forming member.

40. In a cup forming machine the combination with a cup forming member, of a pivoted block, a cup blank holder on said block, a slotted sleeve on said block, a plunger rod in said block projecting into said sleeve, a spring in said plunger rod, a plunger head rotatably supported in the end of said plunger rod against said spring, a cup blank ejector coacting with said blank holder, means connected with said ejector and with said plunger rod, and a mechanism connected with said means adapted when operated in one direction to simultaneously cause retraction of the plunger and projection of said ejector to cause a blank from said holder to be projected from said holder into said sleeve in front of the plunger head, said mechanism adapted when operated in a reverse direction to cause retraction of the ejector and a projection of the plunger rod to cause the blank in said sleeve to be projected therefrom and held against one end of said cup forming member.

41. In a cup forming machine the combination with a cup forming member, of a pivoted block, stops for limiting the movement thereof, said block having a chamber and a slot therein, means for delivering a cup blank into said chamber through said slot, a plunger in said block projecting into said chamber, an arm pivoted on said block, a mechanism connecting said arm with said plunger, and means connected with said arm adapted during a part of its motion to cause the arm and said block to swing to position the plunger in alignment with the forming member and further adapted during the remainder of its motion to actuate said mechanism to cause the plunger to project the blank from said chamber and hold said blank against the forming member.

42. In a cup forming machine the combination with a cup forming member, a pressing member coacting therewith, means for feeding a cup body blank between said forming member and said pressing member, said cup body blank having one margin cut to afford a plurality of tabs which project beyond one end of the forming member, a pivoted block, stops for limiting the movement of said block, one of said stops being adjustable, said block having a chamber and a slot therein, means for delivering a cup bottom blank into said chamber through said slot, a plunger in said block projecting into said chamber, an arm pivoted on said block, a link mechanism connecting said arm with said plunger, means connected with said arm adapted during a part of its motion to cause the arm and said block to swing together to position the plunger in alignment with the forming member and further adapted during the remainder of its motion to actuate said link mechanism to cause the plunger to project the cup bottom blank from said chamber and hold the same against one end of the forming member, and a spring controlled presser mechanism supported on said pivoted block adapted to be moved by said arm into engagement with the cup body blank on said forming member after the plunger has been projected, said presser mechanism adapted to press the tabs on said cup body blank against the cup bottom blank held against the end of the forming member.

43. In a cup forming machine the combination with a forming member adapted to have a cup body blank wrapped therearound, a pivoted member, a slidable feed mechanism therein, an arm pivoted on said pivoted member, operating means for swinging said arm and pivoted member to position the slidable feed mechanism in line with the forming member, an adhesive applying mechanism, a latch for holding the same in a retracted position, said operating means adapted to continue to swing said arm after the feed mechanism is in position to cause operation of the feed mechanism whereby a cup bottom blank is projected and held against the forming member, a presser device supported on said pivoted member, a lever mechanism supported on the pivoted member and connected with the presser device, said arm adapted to actuate the lever mechanism to cause the same to release the latch from engagement with the adhesive applying mechanism, and means for swinging the adhesive applying mechanism into position to apply adhesive to the cup bottom blank while held against the forming member, said arm further adapted to move the presser device into operating position to cause the same to bend and press portions of the cup body blank against the adhesived portions of the cup bottom blank.

44. In a cup forming machine a cup forming member, means for feeding and holding a cup bottom blank against the forming member, a device for wrapping a cup body blank around said forming member and around the edge of said cup bottom blank, said cup body blank cut along one edge to afford a plurality of tabs, an adhesive applying mechanism, latch means for holding the same in release position, a presser device, means for moving the presser device into pressing position and releasing said latch means, and means for swinging said adhesive applying mechanism when released into position to apply adhesive to said cup bottom blank as the presser device presses said cup body blank tabs against the adhesive applied to said cup bottom blank.

45. In a cup forming machine, a cup forming member, a pivoted block, means thereon for feeding and holding a cup bottom blank against the forming member, a device for wrapping a cup body blank around said forming member and around the edge of said cup bottom blank, said cup body blank cut along one edge to afford a plurality of tabs which project beyond the cup bottom blank, an adhesive applying mechanism, spring controlled latch means for holding the adhesive applying mechanism in release position, a shaft journalled in said block, a lever fixed on one end of said shaft, a roller on said lever disposed adjacent the latch means, a second lever fixed on the opposite end of said shaft, a peripherally grooved presser disk rotatably supported on said second lever, means for rotating said shaft to cause the roller bearing lever to swing the latch means out of locking engagement with said adhesive applying mechanism and simultaneously moving the presser disk into pressing position, and means for swinging said adhesive applying mechanism when released into position to apply adhesive to said cup bottom blank as the presser disk presses the projecting tabs of the cup body blank against the adhesived portions of the cup bottom blank in overlapping relation.

46. In a cup forming machine a pair of frustum cup forming cones, a plurality of bearings, paralleled rods slidably projecting through said bearings, a blank feeding table fixed on said rods, and means for reciprocating said table and rods to cause a cup blank to be fed between said forming cones.

47. In a cup forming machine, a pair of cup forming members, a plurality of bearings, parallel rods slidably projecting through said bearings, a blank feeding table fixed to said rods, means for reciprocating said table and rods to cause a cup blank to be fed between said forming members, and an adjustable stop mechanism in one of said bearings for limiting the travel of said table and rods.

48. In a cup forming machine, a pair of cup forming members, a pair of spaced lower bearings, a pair of spaced higher bearings, a rod slidably projecting through said higher bearings, a stop sleeve adjustably threaded into one of said lower bearings, a set screw for holding said stop sleeve in a set position of adjustment, a second rod slidably projecting through the other lower bearing and through said stop sleeve, a carriage fixed on said rods, a table supported on the carriage, and means for reciprocating said rods, carriage and table to cause a cup blank to be fed into the field of operation of said forming members.

49. In a cup forming machine, a forming member, means for feeding and holding a cup bottom blank against one end of said forming member, a feed table, means connected therewith for reciprocating the table to cause a cup body blank to be fed to the forming member, an adhesive applying mechanism adapted to be pulled into a retracted position when the table is retracted, a latch mechanism also adapted to be actuated by the table to engage and hold the adhesive applying mechanism in release position, a presser mechanism, means connected therewith for simultaneously releasing the latch mechanism and moving the presser mechanism into pressing position, and means for moving the adhesive applying mechanism into operating position to apply adhesive to the cup bottom blank as the presser mechanism presses parts of the cup body blank against said cup bottom blank.

50. In a cup forming machine the combination with a forming roller, a pressing roller associated therewith, means for feeding a cup blank between the forming roller and the pressing roller with part of the blank projecting beyond one end of the forming roller, and a bending flange at one end of the pressing roller for bending the projecting part of the blank inwardly toward the end of the forming roller.

51. In a cup forming machine the combination with a forming roller, of means for holding a cup bottom blank against one end of the forming roller, a pivoted frame, a pressing roller supported thereon having a flange at one end thereof, means for feeding a cup body blank between the rollers to permit the flange on the pressing roller to bend parts of the cup body blank, and a presser mounted on said pivoted frame adapted to press the bent parts of the cup body blank against the cup bottom blank.

52. In a cup forming machine the combination with a forming roller, of a pressing roller associated therewith, means for feeding a cup blank between said rollers, an adhesive supplying roller, an auxiliary roller positioned thereabove, and means for moving the auxiliary roller to cause the trailing end of the cup blank to contact the adhesive supplying roller before entering between the forming roller and the pressing roller.

53. In a cup forming machine the combination with a pair of cup forming cones, of means for feeding the advance end of a cup blank between said cones, an adhesive supplying roll, and means for causing the trailing end of the cup blank to contact the adhesive supplying roll to permit the trailing end of the blank to be pressed against and secured to the advance end of said blank by said forming cones.

54. In a cup forming machine the combination with a pair of forming cones, of mechanisms for simultaneously feeding a plurality of cup blanks into the field of operation of said forming cones, and a plurality of bending and pressing mechanisms acting consecutively to bend and then press portions of one of said blanks over and against the other of said blanks.

55. In a cup forming machine the combination with a drive shaft having passages therein, of a passaged cup forming member thereon, means for forming a cup on said forming member, an air valve, means connecting the air valve with the passaged drive shaft, a second shaft driven by the drive shaft, a bell crank connected with said air valve, and a cam on said second shaft adapted to open said valve at a predetermined time to cause the completed cup to be blown from the forming member.

56. In a cup forming machine the combination with a forming roll, of a pivoted member having a slot therein, a blank carrying magazine, means for discharging a blank from the magazine into a position to fall by gravity through said slot into said pivoted member, and means in said pivoted member adapted to push the blank out of said member and against one end of the forming roll.

57. In a cup forming machine the combination with a pivoted support having a slot therein, of a blank holding magazine thereon, means for automatically ejecting a blank from the magazine into a position to permit the blank to fall by gravity through said slot into said support, and means in said pivoted support for pushing the blank therefrom.

58. In a machine of the class described the combination with a pair of cup forming rollers adapted to form a blank into a cup, a pivoted support for one of said rollers, a glue applying device, and an auxiliary roller pivotally supported on said support and adapted to be operated to press the trailing end of the blank against the glue applying device before the trailing end of the blank is pressed against the advance end of the blank by the forming rollers.

59. In a machine of the class described, the combination with a cup forming means, of a pivotally mounted blank feeding means, and means adapted to swing said blank feeding means into alignment with said cup forming means at a predetermined time, feed a blank to said forming means and then swing the feeding means out of alignment with the forming means.

60. In a machine of the class described, the combination with a cup forming means, of reciprocating means for feeding cup blanks to the forming means, and means for swinging the reciprocating means into and out of alignment with the forming means.

61. In a machine for making paper cups, the combination with a support, of a presser roll mounted thereon, and an auxiliary roll also mounted on said support adapted to act on a cup blank in advance of the pressure roll.

62. In a machine for making paper cups, the combination with a support, of a presser roll rotatably mounted thereon, and an auxiliary roll pivotally supported on said support, adapted to act on the trailing end of a cup blank in advance of said presser roll.

63. In a cup making machine the combination with a framework, of a support pivotally mounted thereon, a rotatable presser roll on said support, an auxiliary support pivotally mounted on said support, an auxiliary roll on said auxiliary support, and means for actuating said auxiliary support to cause the auxiliary roll to act on the trailing end of a cup blank in advance of the presser roll.

64. In a cup forming machine the combination with a cup forming roll, of mechanisms for simultaneously feeding a plurality of cup blanks to said forming roll, and means for folding one of said cup blanks over and against the other of said cup blanks.

65. In a cup forming machine the combiation with a forming member, of a pivotally mounted presser member co-acting therewith, and a rotatably mounted disk for holding a blank against one end of said forming member during a cup forming operation.

66. The combination with a cup forming member, of a spring impelled reciprocating member adapted to hold a cup blank against the forming member.

67. In a machine for making paper cups, the combination with a pivoted support, of a plurality of rolls mounted thereon and adapted to act in sequence on a cup blank.

68. In a cup making machine the combination with a pivoted support, of a presser member thereon, and an auxiliary roll pivotally supported on said pivoted support.

In testimony whereof I have hereunto subscribed my name in the presence of two subscribing witnesses:

RUDOLPH HOLMAN.

Witnesses:
FRED E. PAESLER,
JAMES W. O'BRIEN.